United States Patent
Takeuchi et al.

(10) Patent No.: US 6,879,753 B2
(45) Date of Patent: Apr. 12, 2005

(54) DISPLAY DEVICE

(75) Inventors: Yukihisa Takeuchi, Nishikamo-Gun (JP); Tsutomu Nanataki, Toyoaki (JP); Natsumi Shimogawa, Nagoya (JP); Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 268 days.

(21) Appl. No.: 10/167,841

(22) Filed: Jun. 12, 2002

(65) Prior Publication Data

US 2002/0191947 A1 Dec. 19, 2002

(30) Foreign Application Priority Data

| Jun. 15, 2001 | (JP) | 2001-182546 |
| Sep. 18, 2001 | (JP) | 2001-284021 |
| May 24, 2002 | (JP) | 2002-150629 |

(51) Int. Cl.$^7$ .............................................. G02B 6/26
(52) U.S. Cl. ................................. 385/31; 385/147
(58) Field of Search ........................... 235/31, 147, 1, 235/120; 385/147, 129, 2, 901, 1, 120; 345/108, 30

(56) References Cited

U.S. PATENT DOCUMENTS

| 4,113,360 A | 9/1978 | Baur et al. |
| 5,636,072 A | 6/1997 | Shibata et al. |
| 5,771,321 A | 6/1998 | Stern |
| 5,774,257 A | 6/1998 | Shibata et al. |
| 5,862,275 A | 1/1999 | Takeuchi et al. |
| 5,953,469 A | 9/1999 | Zhou |
| 6,028,978 A * | 2/2000 | Takeuchi et al. ............ 365/147 |
| 6,211,853 B1 | 4/2001 | Takeuchi et al. |
| 6,281,868 B1 | 8/2001 | Takeuchi et al. |
| 6,323,833 B1 | 11/2001 | Takeuchi et al. |
| 6,381,381 B1 | 4/2002 | Takeda et al. |
| 6,470,115 B1 | 10/2002 | Yonekubo |
| 2001/0024555 A1 * | 9/2001 | Takeuchi et al. ............ 385/120 |
| 2001/0053259 A1 * | 12/2001 | Takeuchi et al. ............... 385/1 |
| 2002/0191947 A1 * | 12/2002 | Takeuchi et al. ............ 385/147 |

FOREIGN PATENT DOCUMENTS

| EP | 0 408 305 B1 | 1/1991 |
| EP | 0 675 477 A1 | 10/1995 |
| JP | 54-142089 A | 11/1979 |
| JP | 10-078549 | 3/1998 |
| JP | 11-072721 A | 3/1999 |
| JP | 11-202222 A | 7/1999 |
| JP | 2000-075223 | 3/2000 |
| WO | 99/24859 | 5/1999 |
| WO | 99/36824 | 7/1999 |

OTHER PUBLICATIONS

U.S. Appl. No. 09/341,151, filed Jul. 1, 1999, Takeuchi et al.
U.S. Appl. No. 09/749,252, filed Dec. 27, 2000, Takeuchi et al.
U.S. Appl. No. 09/749,244, filed Dec. 27, 2000, Takeuchi et al.
U.S. Appl. No. 10/230,869, filed Aug. 29, 2002, Takeuchi et al.
U.S. Appl. No. 10/163,212, filed Jun. 5, 2002, Takeuchi et al.

* cited by examiner

Primary Examiner—Thien M. Le
(74) Attorney, Agent, or Firm—Burr & Brown

(57) ABSTRACT

A display device comprises an actuator substrate which has actuator elements, an optical waveguide plate, crosspieces which intervene between the optical waveguide plate and the actuator substrate and which surround the actuator element, and picture element assemblies which are joined onto the actuator elements. The picture element assembly includes a transparent layer which makes contact with the optical waveguide plate or which stands close to the optical waveguide plate, and a color layer which is arranged under the transparent layer. An opposed area of the transparent layer opposed to the optical waveguide plate is identical with or smaller than a projected area of the color layer.

22 Claims, 15 Drawing Sheets

FIG. 9

| OFFSET POTENTIAL | ON SIGNAL | OFF SIGNAL |
|---|---|---|
| | 0V | 60V |
| 10V | -10V (LIGHT EMISSION) | 50V (LIGHT OFF) |

DISPLAY DEVICE

BACKGROUND OF THE INVENTION

1. Field of the Invention

The present invention relates to a display device. In particular, the present invention relates to a display device for displaying a screen image corresponding to an image signal on an optical waveguide plate by controlling a displacement action of an actuator element in a direction to make contact or separation with respect to the optical waveguide plate in accordance with an attribute of the image signal to be inputted so that leakage light is controlled at a predetermined portion of the optical waveguide plate.

2. Description of the Related Art

Display devices such as cathode ray tubes (CRT), liquid crystal display devices and plasma displays have been known.

Ordinary television receivers and monitor units for computers have been known as the cathode ray tubes. Although the cathode ray tube has a bright screen, it consumes a large amount of electric power. Further, the depth of the entire display device is large in proportion to the size of the screen. Still further, the resolution is deteriorated at the peripheral portion of a displayed image, the image or the graphic is distorted, the memory function is not effected, and it is impossible to make a large display, for the following reason.

That is, the electron beam, which is radiated from the electron gun, is greatly deflected. Therefore, the light emission spot (beam spot) is widened at the portion at which the electron beam arrives at the fluorescent screen of the Braun tube, and the image is displayed obliquely. As a result, the distortion occurs in the displayed image, because there is a certain limit to maintain the large space in the Braun tube in vacuum.

On the other hand, the liquid crystal display device is advantageous in that the entire device can be miniaturized, and the display device consumes a small amount of electric power. However, the liquid crystal display device is inferior in luminance of the screen, and the field angle of the screen is narrow. Further, the arrangement of a driving circuit is extremely complicated, because the gradational expression is performed on the basis of the voltage level.

For example, when digital data lines are used, the driving circuit therefor comprises a latching circuit for holding component RGB data (each 8-bit) for a predetermined period of time, a voltage selector, a multiplexer for making changeover to voltage levels of types corresponding to a number of gradations, and an output circuit for adding output data from the multiplexer to the digital data lines. In this case, when the number of gradations is increased, it is necessary to perform the switching operation at an extremely large number of levels in the multiplexer. Therefore, the circuit construction is complicated.

When analog data lines are used, the driving circuit therefor comprises a shift register for aligning, in the horizontal direction, component RGB data (each 8-bit) to be successively inputted, a latching circuit for holding parallel data from the shift register for a predetermined period of time, a level shifter for adjusting the voltage level, a D/A converter for converting output data from the level shifter into an analog signal, and an output circuit for adding the output signal from the D/A converter to the analog data lines. In this case, a predetermined voltage corresponding to the gradation is obtained by using an operational amplifier in the D/A converter. However, when the range of the gradation is widened, it is necessary to use an operational amplifier which outputs a highly accurate voltage, resulting in such drawbacks that the structure is complicated and the price is expensive as well.

The plasma display has the following advantages. That is, it is possible to realize a small size, because the display section itself occupies a small volume. Further, the plasma display is comfortably viewed, because the display surface is flat. Especially, the alternating current type plasma display also has such an advantage that it is unnecessary to use any refresh memory owing to the memory function of the cell.

As for the plasma display described above, in order to allow the cell to have the memory function, it is necessary to continue the electric discharge by switching the polarity of the applied voltage in an alternating manner. For this purpose, it is necessary that a driving circuit has a first pulse generator for generating the sustain pulse in the X direction, and a second pulse generator for generating the sustain pulse in the Y direction. Therefore, the arrangement of the driving circuit is inevitably complicated.

On the other hand, in order to solve the problems concerning the CRT, the liquid crystal display device, and the plasma display as described above, the present applicant has suggested a novel display device (see, for example, Japanese Laid-Open Patent Publication No. 7-287176). As shown in FIG. 15, this display device includes actuator elements 400 which are arranged for respective picture elements (image pixels). Each of the actuator elements 400 comprises a main actuator element 408 and a substrate 414. The main actuator element 408 includes a piezoelectric/electrostrictive layer 402 and an upper electrode 404 and a lower electrode 406 formed on upper and lower surfaces of the piezoelectric/electrostrictive layer 402 respectively. The substrate 414 includes a vibrating section 410 and a fixed section 412 disposed under the main actuator element 408. The lower electrode 406 of the main actuator element 408 contacts with the vibrating section 410. The main actuator element 408 is supported by the vibrating section 410.

The substrate 414 is composed of ceramics in which the vibrating section 410 and the fixed section 412 are integrated into one unit. A recess 416 is formed in the substrate 414 so that the vibrating section 410 is thin-walled.

A picture element assembly 420 for obtaining a predetermined size of contact area with respect to an optical waveguide plate 418 is connected to the upper electrode 404 of the main actuator element 408. As shown in FIG. 15, the picture element assembly 420 is located near the optical waveguide plate 418 in the ordinary state in which the actuator element 400 stands still. The picture element assembly 420 contacts the optical waveguide plate 418 in the excited state at a distance of not more than the wavelength of the light.

The light 422 is introduced, for example, from a lateral end of the optical waveguide plate 418. In this arrangement, all of the light 422 is totally reflected in the optical waveguide plate 418 without being transmitted through the front and back surfaces thereof by controlling the magnitude of the refractive index of the optical waveguide plate 418. In this state, a voltage signal corresponding to an attribute of an image signal is selectively applied to the actuator element 400 by the aid of the upper electrode 404 and the lower electrode 406. Accordingly, the actuator element 400 stands still in the ordinary state or is displaced in the excited state. That is, the picture element assembly 420 is controlled for its contact and separation with respect to the optical waveguide plate 418. As a result, the scattered light (leakage light) 424 is controlled at a predetermined portion of the optical waveguide plate 418, and a screen image corresponding to the image signal is displayed on the optical waveguide plate 418.

This display device has, for example, the following advantages. That is, (1) it is possible to decrease the electric power consumption, (2) it is possible increase the screen luminance, and (3) it is unnecessary to increase the number of picture elements as compared with the black-and-white screen when a color screen is constructed.

SUMMARY OF THE INVENTION

An object of the present invention is to provide a display device which makes it possible to improve the rate of utilization of light introduced into the picture element assembly 420 and improve the contrast as well by improving the display device using the actuator element 400 as described above.

The display device according to the present invention comprises a substrate which has actuator elements, an optical waveguide plate, crosspieces, and picture element assemblies which are joined onto the actuator elements. The crosspieces are formed to intervene between the optical waveguide plate and the substrate and surround the actuator element. The picture element assembly includes a transparent layer which makes contact with the optical waveguide plate or which stands close to the optical waveguide plate. An area of a surface of the transparent layer opposed to the optical waveguide plate is identical with or smaller than a projected area on a plane of each of the other layers for constructing the picture element assembly.

Accordingly, when the transparent layer makes contact with the optical waveguide plate, or when the transparent layer stands close to the optical waveguide plate, then the light, which comes from the optical waveguide plate, is introduced into the picture element assembly through the surface of the transparent layer opposed to the optical waveguide plate. The light, which has been introduced into the picture element assembly, travels toward the actuator substrate.

During this process, if the projected area of each of the other layers for constructing the picture element assembly is identical with or smaller than the area of the surface of the transparent layer opposed to the optical waveguide plate, then a part of the light introduced through the surface of the transparent layer opposed to the optical waveguide plate, especially the light, which is transmitted through side surfaces of the transparent layer, arrives at the actuator element and/or the actuator substrate, and the light is reflected as unnecessary scattered light toward the optical waveguide plate. In this situation, the scattered light (scattered light effective to make display), which is brought about by the reflection of the light having effectively arrived at the picture element assembly, may be mixed with the unnecessary scattered light, resulting in decrease in apparent luminance and decrease in contrast.

In view of the above, it is conceived that the areas of both of the transparent layer and the other layers are widened. However, if the area of the transparent layer (area opposed to the optical waveguide plate) is widened, the area, with which the transparent layer contacts with the optical waveguide plate, is also widened. Therefore, the amount of light introduced into the picture element assembly is increased, and a larger amount of light is consumed by one picture element (image pixel) or by one dot. As a result, the amount of light supplied to the central portion of the optical waveguide plate may be decreased, for example, when the light is introduced from the periphery of the optical waveguide plate, and the evenness (uniformity) of the display luminance may be lowered when a single color is displayed. If the area of the transparent layer is widened as described above, the optical waveguide plate and the transparent layer tend to tightly contact each other, and the light emission of the picture element may be insufficiently quenched.

However, in the present invention, the area of the surface of the transparent layer opposed to the optical waveguide plate is identical with or smaller than the projected area on the plane of each of the other layers for constructing the picture element assembly. Therefore, all of the light introduced from the surface of the transparent layer opposed to the optical waveguide plate including the light transmitted through the side surfaces of the transparent layer arrives at the picture element assembly, and the light is reflected as the effective scattered light toward the optical waveguide plate.

Therefore, in the display device according to the present invention, it is possible to greatly improve the rate of utilization of the light introduced into the picture element assembly, and it is possible to improve the luminance. Accordingly, it is possible to decrease the area of the surface of the transparent layer opposed to the optical waveguide plate, it is possible to reduce the amount of light introduced into the picture element assembly, and it is possible to decrease the consumption of light per one picture element or one dot.

As a result, for example, when the light is introduced from the periphery of the optical waveguide plate, an amount of light supplied centrally to the optical waveguide plate does not decrease. Further, it is possible to secure the evenness (uniformity) of the display luminance when a single color is displayed. Still further, the optical waveguide plate and the transparent layer do not tightly contact each other.

In the above arrangement, the other layers may include a white scattering element. In this arrangement, all of the light, which has been introduced from the surface of the transparent layer opposed to the optical waveguide plate including the light transmitted through the side surfaces of the transparent layer, arrives at the picture element assembly. Especially, the light, which has arrived at the white scattering element, is reflected as the effective scattered light toward the optical waveguide plate.

Alternatively, the other layers may include a color layer, or the other layers may include a white scattering element and a color layer. In this arrangement, it is preferable that a projected area on a plane of the white scattering element is identical with or smaller than a projected area on a plane of the color layer. Accordingly, the light does not directly abut the white scattering element layer without passing through the color layer, and any unnecessary scattered light is not generated. As a result, the display device does not cause any deterioration of image quality including, for example, the decrease in contrast and the decrease in color purity.

In the present invention, when the actuator element includes a vibrating section which is provided for the substrate and a main actuator element which is formed on the vibrating section, a projected area on a plane of the picture element assembly may be identical with or smaller than a projected area on a plane of the vibrating section.

Further, the projected area on the plane of the picture element assembly may be smaller than a projected area on a plane of the main actuator element. In this arrangement, the color layer does not inhibit the displacement action of the actuator element.

A color filter or a color scattering element can be used for the color layer. Additionally, it is possible to use a white color layer in which a color layer and a white scattering element layer are integrated into one unit.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 shows a table illustrating the relationship concerning the offset potential (bias potential) outputted from a row electrode-driving circuit, the electric potentials of an ON signal and an OFF signal outputted from a column electrode-driving circuit, and the voltage applied between a row electrode and a column electrode;

DESCRIPTION OF THE PREFERRED EMBODIMENTS

Illustrative embodiments of the display device according to the present invention will be explained below with reference to FIGS. 1 to 14.

Figure 1:
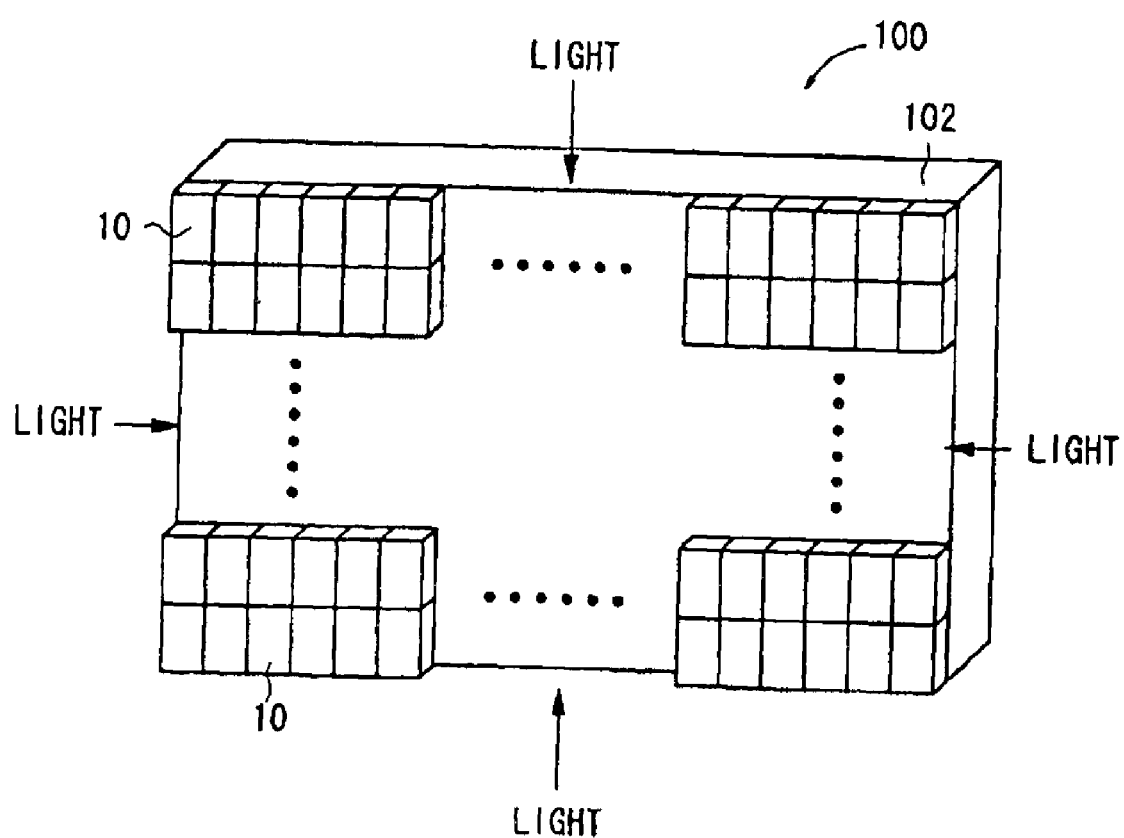
FIG. 1 shows an arrangement of a large screen display constructed by arranging a plurality of display devices according to an embodiment of the present invention.

The display device 10 according to an embodiment of the present invention may be used, for example, as shown in FIG. 1. That is, a large screen display 100 can be constructed by arranging a plurality of display devices 10 in the vertical direction and in the horizontal direction on a first principal surface of a large-sized optical guide plate 102. The large-sized optical guide plate 102 is composed of, for example, glass or acrylic resin. Characteristically, the display 100 is of the direct vision type and of the thin type in which the luminance is high and the angle of view is wide.

Screens of various shapes such as a horizontally longer screen, a vertically longer screen and a circular screen can be formed by arbitrarily changing the arrangement of the display devices 10, in addition to ordinary rectangular displays. When the optical guide plate is curved beforehand, a curved surface display can be also formed.

Figure 2:
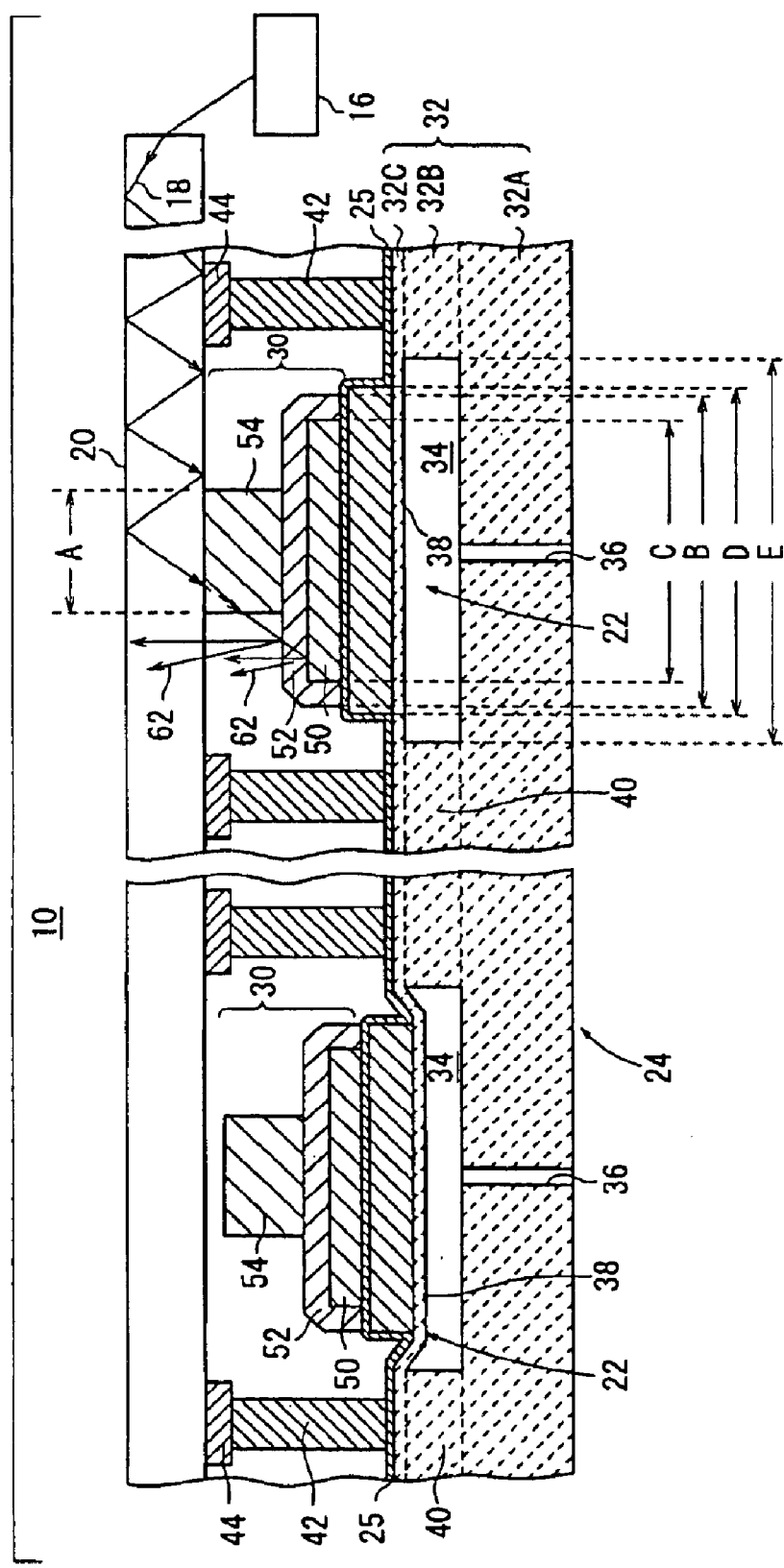
FIG. 2 shows an arrangement illustrating the display device according to the embodiment of the present invention.

As shown in FIG. 2, the display device 10 according to the embodiment of the present invention comprises an optical waveguide plate 20 and a driving section 24. Light 18 from a light source 16 is introduced into the optical waveguide plate 20. The driving section 24 is provided opposingly to the back surface of the optical waveguide plate 20, in which a large number of actuator elements 22 are arranged in a matrix form or in a zigzag form corresponding to picture elements (image pixels).

Figure 4:
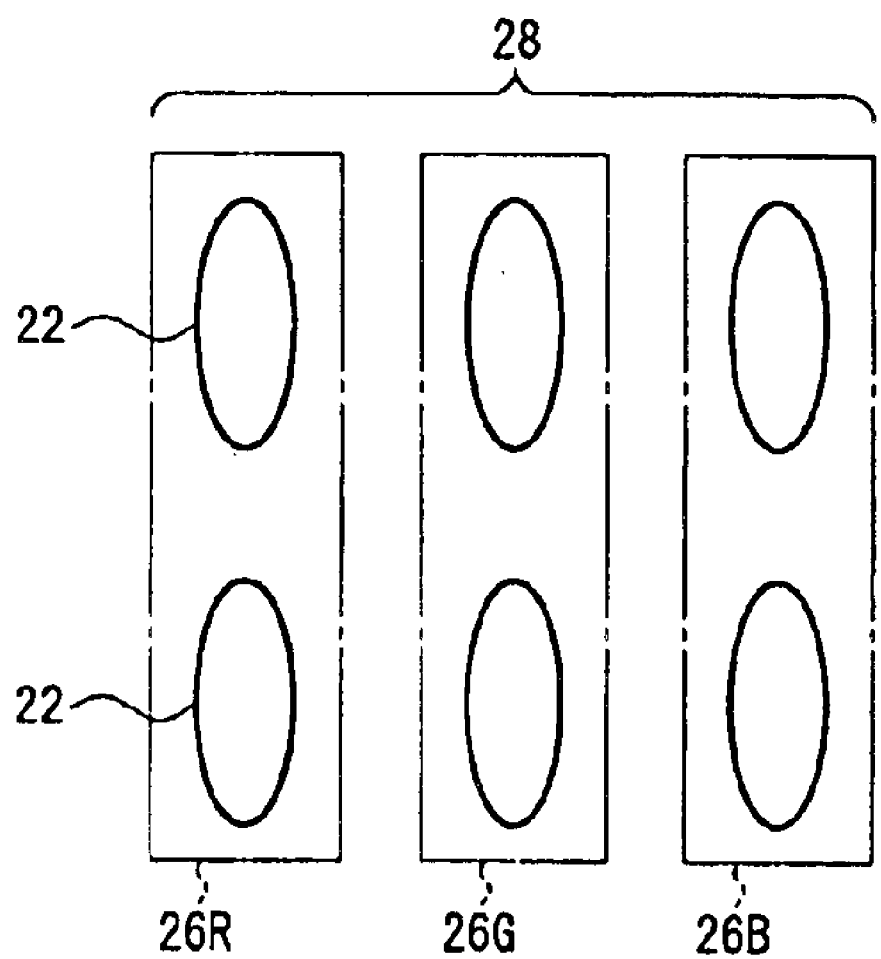
FIG. 4 illustrates an arrangement of a picture element of the display device according to the embodiment of the present invention.

The arrangement of the picture element array is as follows, for example, as shown in FIG. 4. That is, one dot 26 is constructed by two actuator elements 22 which are aligned in the vertical direction. One picture element 28 is constructed by three dots 26 (red dot 26R, green dot 26G, and blue dot 26B) which are aligned in the horizontal direction. In the display device 10, the picture elements 28 are aligned such that sixteen individuals (48 dots) are arranged in the horizontal direction, and sixteen individuals (16 dots) are arranged in the vertical direction.

The large screen display 100 shown in FIG. 1 conforms, for example, to the VGA standard. That is, forty individuals of the display devices 10 are arranged in the horizontal direction, and thirty individuals of the display devices 10 are arranged in the vertical direction on the back surface of the optical guide plate 102. Accordingly, 640 picture elements (1920 dots) are aligned in the horizontal direction, and 480 picture elements (480 dots) are aligned in the vertical direction.

The uniform optical guide plate 102 having a large light transmittance in the visible light region, such as glass plates and acrylic plates, are used. The respective display devices 10 are mutually connected to one another, for example, by means of wire bonding, soldering, end surface connector, or back surface connector so as to make it possible to supply signals between the mutual display devices 10.

It is preferable that the refractive index of the optical guide plate 102 is similar to that of the optical waveguide plate 20 of each of the display devices 10. When the optical guide plate 102 and the optical waveguide plates 20 are bonded to one another, it is also preferable to use a transparent adhesive. Preferably, the adhesive is uniform and it has a high transmittance in the visible light region in the same manner as the optical guide plate 102 and the optical waveguide plate 20. It is also desirable that the refractive index of the adhesive is similar to those of the optical guide plate 102 and the optical waveguide plate 20 in order to ensure the brightness of the screen.

In each of the display devices 10, as shown in FIG. 2, a picture element assembly 30 is stacked on each of the actuator elements 22.

The driving section 24 includes an actuator substrate 32 composed of, for example, ceramics. Two actuator elements 22 are arranged at portions at which the respective dots 26 of the actuator substrate 32 are to be formed. The actuator substrate 32 has its first principal surface which is arranged to oppose to the back surface of the optical waveguide plate 20. The first principal surface is a continuous surface (flushed surface). Hollow spaces 34 for forming respective vibrating sections are provided in the actuator substrate 32 at positions corresponding to the portions at which the respective actuator elements 22 are to be formed. The respective hollow spaces 34 communicate with the outside via through-holes 36 each of which has a small diameter and which are provided at the second principal surface of the actuator substrate 32.

The portion of the actuator substrate 32, at which the hollow space 34 is formed, is thin-walled. The other portion of the actuator substrate 32 is thick-walled. The thin-walled portion has a structure which tends to undergo vibration in response to external stress, and it functions as a vibrating section 38. The portion other than the hollow space 34 is thick-walled, and it functions as a fixed section 40 for supporting the vibrating section 38.

That is, the actuator substrate 32 has a stacked structure comprising a substrate layer 32A as a lowermost layer, a spacer layer 32B as an intermediate layer, and a thin plate layer 32C as an uppermost layer. The actuator substrate 32 has an integrated structure including the hollow spaces 34 formed at the positions in the spacer layer 32B corresponding to the actuator elements 22. The substrate layer 32A functions as a substrate for reinforcement, as well as it functions as a substrate for wiring. The actuator substrate 32 may be sintered in an integrated manner, or it may be additionally attached (for example, components of the actuator substrate 32 may be bonded with an adhesive).

The thickness of the thin plate layer 32C is usually not more than 50 $\mu$m and preferably 3 to 20 $\mu$m in order to greatly displace the actuator element 22.

Figure 3:
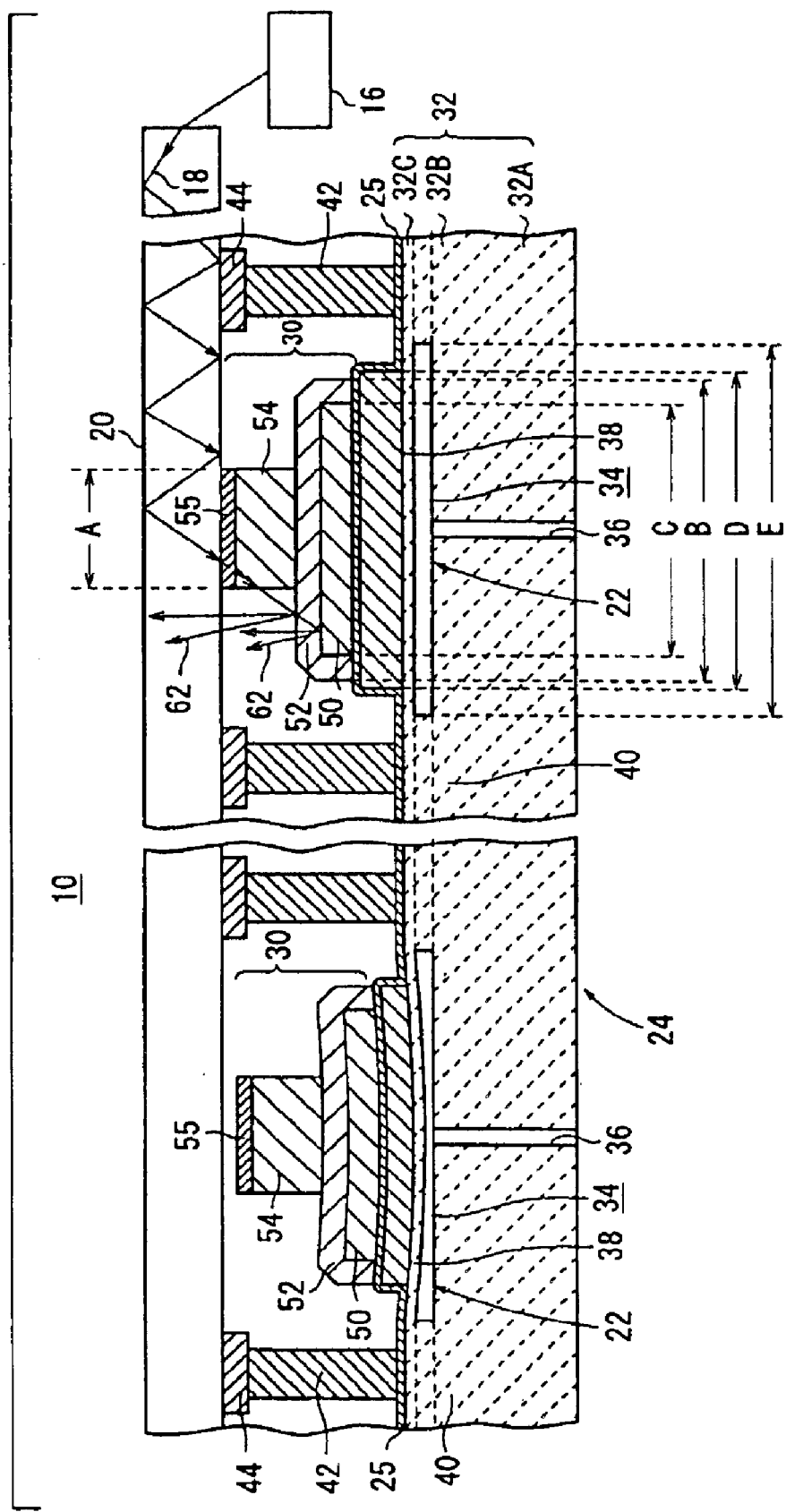
FIG. 3 shows another exemplary arrangement of the display device according to the embodiment of the present invention.

The spacer layer 32B constitutes the hollow space 34 in the actuator substrate 32, and its thickness is not specifically limited. However, the thickness may be determined depending on the purpose of use of the hollow space 34. For example, the thickness is not more than a thickness which is necessary for the actuator element 22 to function. That is, as shown in FIG. 3, it is preferable that the thickness of the spacer layer 32B is thin. Specifically, it is preferable that the thickness of the spacer layer 32B is equivalent to the magnitude of the displacement of the actuator element 22 to be used.

Accordingly, the flexion of the thin-walled portion (portion of the vibrating section 38) is restricted by the substrate layer 32A. It is possible to prevent the thin-walled portion from destruction which would be otherwise caused by unintentional application of any external force. It is also possible to stabilize the displacement of the actuator element 22 to have a specified value by utilizing the effect to restrict the flexion brought about by the substrate layer 32A.

When the spacer layer 32B is made thin, then the thickness of the actuator substrate 32 itself is decreased, and it is possible to decrease the flexural rigidity. Accordingly, for example, when the actuator substrate 32 is bonded and fixed to another member, then the warpage or the like of the subject (in this case, the actuator substrate 32) is effectively reformed with respect to the object (for example, the optical waveguide plate 20), and it is possible to improve the reliability of the bonding and the fixation.

The actuator substrate 32 is made thin as a whole, and hence it is possible to reduce the amount of use of raw materials when the actuator substrate 32 is produced. This feature is also advantageous in view of the production cost. Therefore, in particular, it is preferable that the thickness of the spacer layer 32B is 3 to 50 $\mu$m. Especially, it is preferable that the thickness of the spacer layer 32B is 3 to 20 $\mu$m.

On the other hand, the thickness of the substrate layer 32A is not less than 50 $\mu$m and preferably about 80 to 300 $\mu$m in order to reinforce the entire actuator substrate 32, because the spacer layer 32B is made thin as described above.

Specified embodiments of the actuator element 22 and the picture element assembly 30 will now be explained with reference to FIG. 5 as well. It is assumed that a light-shielding layer 44 is provided between the optical waveguide plate 20 and the crosspiece 42 as described later on.

Figure 5:
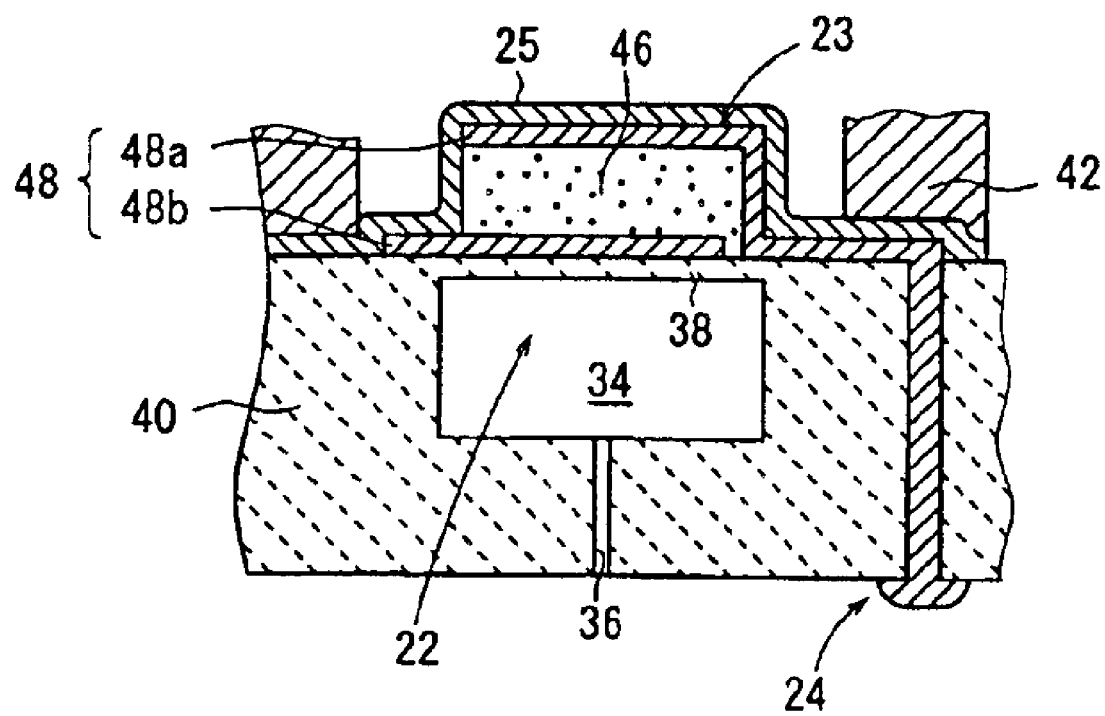
FIG. 5 illustrates an arrangement of an actuator element.

At first, as shown in FIG. 5, each of the actuator elements 22 comprises the vibrating section 38 and the fixed section 40 described above, as well as a main actuator element 23. The main actuator element 23 has, for example, a shape-retaining layer 46 such as a piezoelectric/electrostrictive layer or an anti-ferroelectric layer directly formed on the vibrating section 38, and a pair of electrodes 48 (a row electrode 48a and a column electrode 48b) formed on an upper surface and a lower surface of the shape-retaining layer 46. A light-absorbing layer 25 is formed on the substantially entire surface of the actuator substrate 32 including the respective main actuator elements 23. When the light-absorbing layer 25 is formed, the light, which comes from the outside into the main actuator element 23 and the actuator substrate 32, is not scattered toward the display surface. Thus, it is possible to improve the contrast.

As shown in FIG. 5, the pair of electrodes 48 may have a structure in which they are formed on upper and lower sides of the shape-retaining layer 46, or the pair of electrodes 48 may have a structure in which they are formed on only one side of the shape-retaining layer 46 although not shown. Alternatively, the pair of electrodes 48 (48a, 48b) may be formed on only the upper portion of the shape-retaining layer 46.

Figure 6:
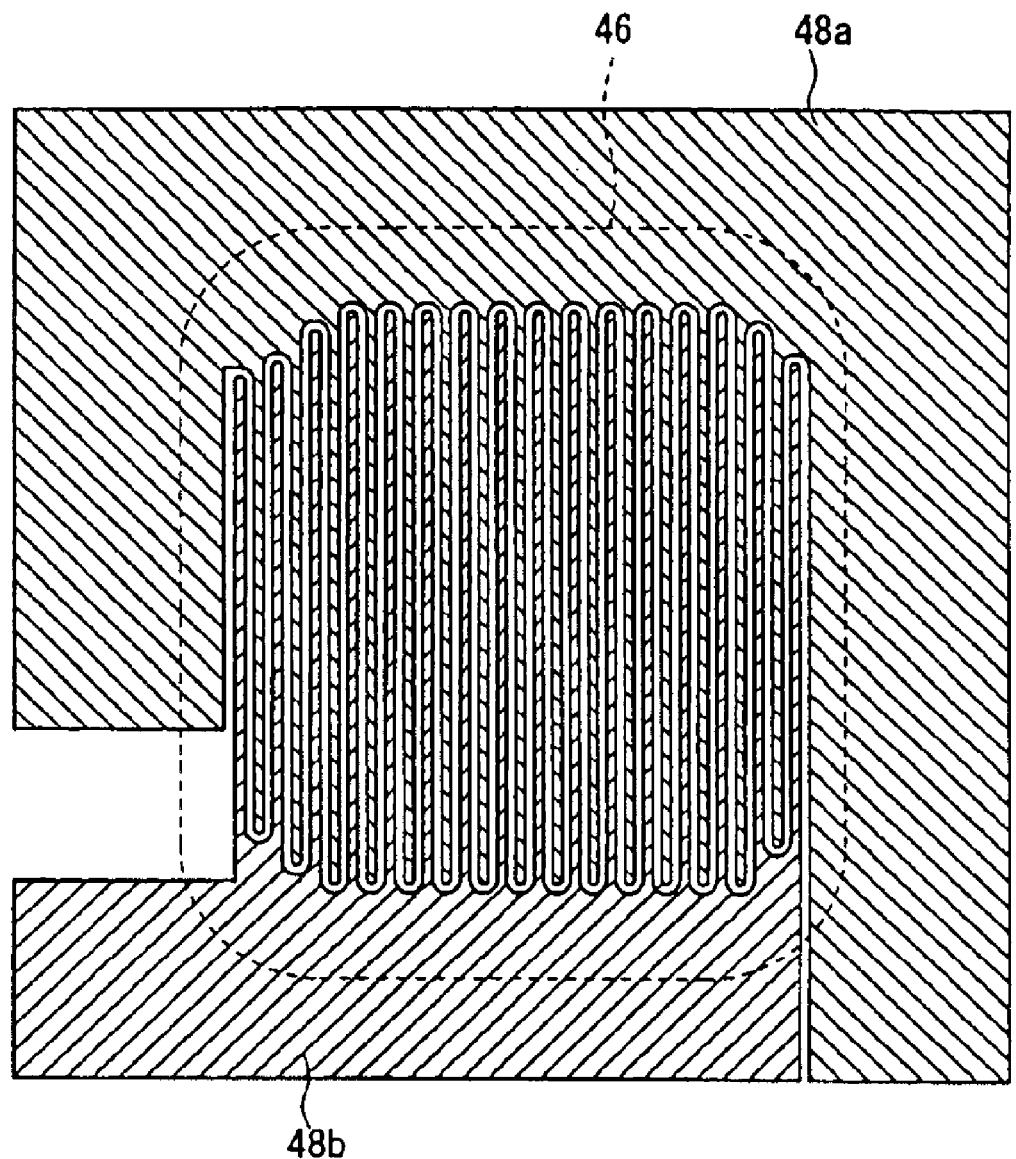
FIG. 6 shows an example of a planar configuration of a pair of electrodes formed on the actuator element.

When the pair of electrodes 48 are formed on only the upper portion of the shape-retaining layer 46, the planar configuration of the pair of electrodes 48 may be a shape in which a large number of comb teeth are opposed to one another in a complementary manner as shown in FIG. 6. Alternatively, it is possible to adopt, for example, the spiral configuration and the branched configuration as disclosed in Japanese Laid-Open Patent Publication No. 10-78549 as well.

On the other hand, as shown in FIG. 2, for example, the picture element assembly 30 can be constructed by a stack comprising a white scattering element 50, a color layer 52, and a transparent layer 54 formed on the color layer 52. The white scattering element 50 is formed on the main actuator element 23 with the light-absorbing layer 25 intervening therebetween. The color layer 52 is formed on the main actuator element 23 so that the white scattering element 50 is covered therewith. The picture element assembly 30 also functions as a displacement-transmitting section of the actuator element 22. For example, a color filter or a color scattering element can be used for the color layer 52.

Other than the arrangement shown in FIG. 2, the picture element assembly 30 can be also constructed as shown in FIG. 3. That is, the picture element assembly 30 includes a stack comprising a white scattering element 50, a color layer 52, and a transparent layer 54, and an adhesion suppressant layer 55 formed on the upper end surface of the stack.

Further, although not shown, a light-reflective layer may be allowed to intervene as a lower layer of the white scattering element 50 or the color layer 52. In this arrangement, it is desirable that an insulating layer is formed between the light-reflective layer and the main actuator element 23.

As shown in FIGS. 2 and 3, the display device 10 according to the embodiment of the present invention comprises the crosspieces 42 which are disposed between the optical waveguide plate 20 and the actuator substrate 32. The crosspieces 42 are formed at the portions other than the picture element assembly 30. It is preferable that the material for the crosspiece 42 is not deformed by heat and pressure.

Figure 7:
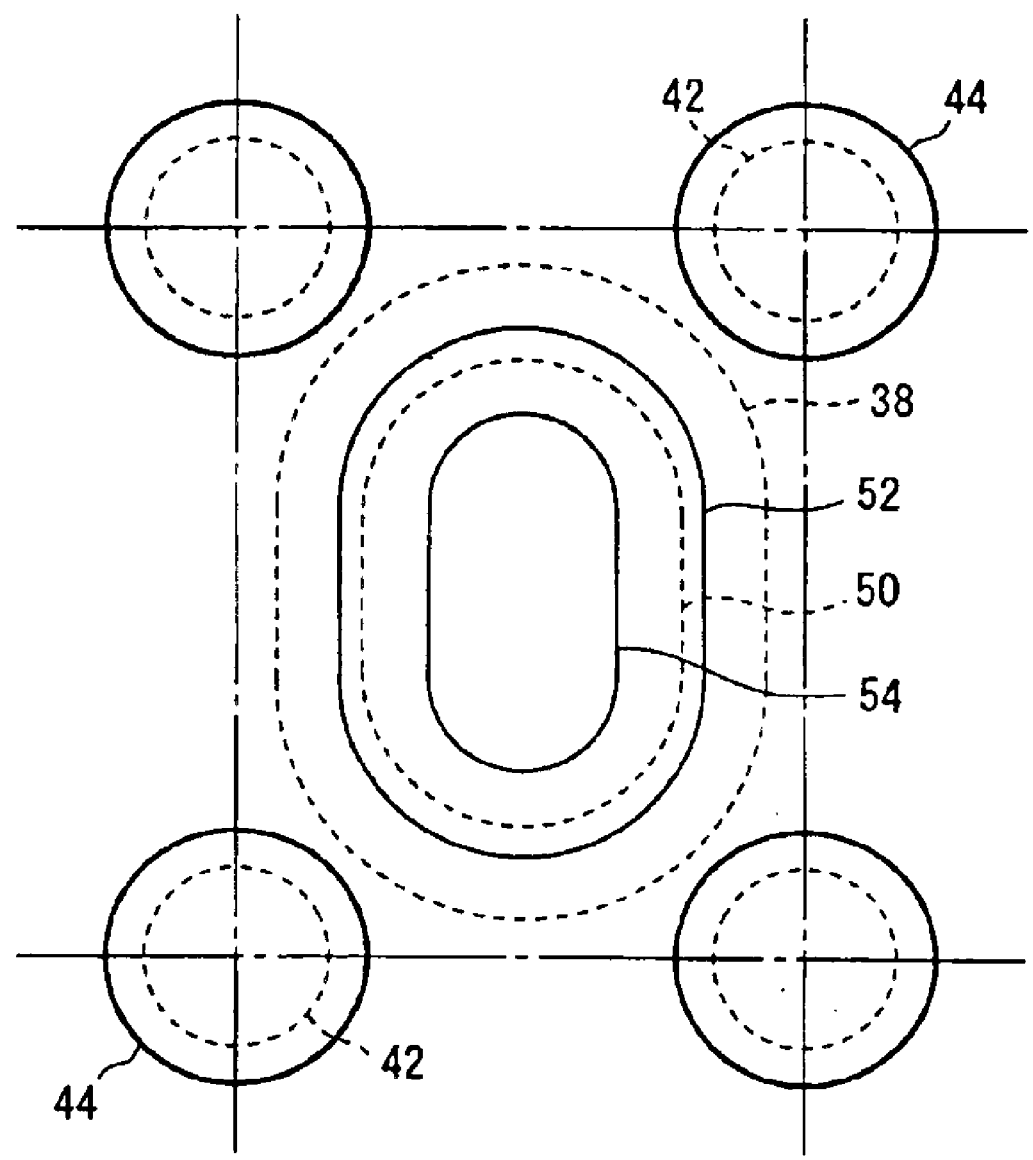
FIG. 7 shows a plan view illustrating the positional relationship between a picture element assembly and crosspieces and the dimensional relationship among respective constitutive members of the picture element assembly.

The crosspieces 42 can be formed, for example, at portions around four corners of the picture element assembly 30. The portions around four corners of the picture element assembly 30 are herein exemplified, for example, by positions corresponding to the respective corners as shown in FIG. 7, for example, when the picture element assembly 30 (see FIG. 2) has a substantially rectangular or elliptic planar configuration. FIG. 7 is illustrative of a form in which one crosspiece 42 is shared by the adjoining picture element assembly 30. In this arrangement, it is preferable that the crosspieces 42 are arranged outside the vibrating section 38. Accordingly, the displacement action of the actuator element 22 is not inhibited by the crosspieces 42.

Figure 8:
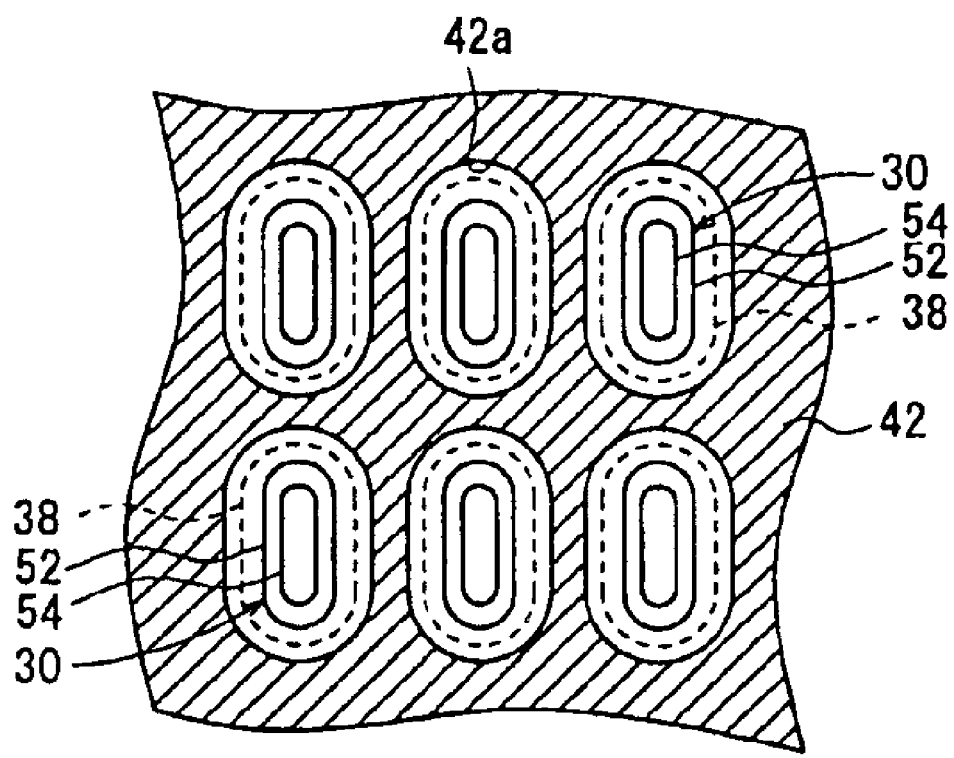
FIG. 8 illustrates another arrangement of the crosspiece.

Another example of the crosspiece 42 is shown in FIG. 8. That is, the crosspiece 42 may have windows 42a each of which surrounds at least one picture element assembly 30, for example, when the crosspiece 42 is composed of a light-absorbing material. Typically, the crosspiece 42 itself is of a plate shape. Windows (openings) 42a, each of which has a shape similar to the outer configuration of the picture element assembly 30, are formed at the positions corresponding to the picture element assemblies 30. Accordingly, all of the side surfaces of the picture element assembly 30 are consequently surrounded by the crosspiece 42. Thus, the actuator substrate 32 and the optical waveguide plate 20 are secured to one another more tightly. In this arrangement, it is preferable that the opening width 42a of the crosspiece 42 is larger than the vibrating section 38 (larger than the area E (see FIG. 2) of the projected plane on the plane of the vibrating section 38). Accordingly, the displacement action of the actuator element 22 is not inhibited by the crosspiece 42.

Explanation will now be made for the respective constitutive members of the display device 10, especially for the selection of the material or the like for the respective constitutive member.

At first, the light 18 to be introduced into the optical waveguide plate 20 may be any one of ultraviolet, visible, and infrared regions. With respect to the light source 16, it is possible to use incandescent lamp, deuterium discharge lamp, fluorescent lamp, mercury lamp, metal halide lamp, halogen lamp, xenon lamp, tritium lamp, light emitting diode, laser, plasma light source, hot cathode tube (or one arranged with carbon nano tube-field emitter in place of filament-shaped hot cathode), and cold cathode tube.

It is preferable that the vibrating section 38 is composed of a highly heat-resistant material, for the following reason. That is, when the actuator element 22 has the structure in which the vibrating section 38 is directly supported by the fixed section 40 without using any material such as an organic adhesive which is inferior in heat resistance, the vibrating section 38 is preferably composed of a highly heat-resistant material in order that the vibrating section 38 is not deteriorated in quality at least during the formation of the shape-retaining layer 46.

It is preferable that the vibrating section 38 is composed of an electrically insulative material in order to electrically separate the wiring connected to the row electrode 48a of the pair of electrodes 48 formed on the actuator substrate 32, from the wiring (for example, data line) connected to the column electrode 48b.

Therefore, the vibrating section 38 may be composed of a material such as a highly heat-resistant metal and a porcelain enamel produced by coating a surface of such a metal with a ceramic material such as glass. However, the vibrating section 38 is optimally composed of ceramics.

With respect to the ceramics of the vibrating section 38, it is possible to use stabilized zirconium oxide, aluminum oxide, magnesium oxide, titanium oxide, spinel, mullite, aluminum nitride, silicon nitride, glass, and mixtures thereof. Stabilized zirconium oxide is especially preferred because of, for example, high mechanical strength obtained even when the thickness of the vibrating section 38 is thin, high toughness, and small chemical reactivity with the shape-retaining layer 46 and the pair of electrodes 48. The term "stabilized zirconium oxide" includes fully stabilized zirconium oxide and partially stabilized zirconium oxide. Stabilized zirconium oxide has a crystal structure such as cubic crystal, and hence it does not cause phase transition.

On the other hand, zirconium oxide causes phase transition between monoclinic crystal and tetragonal crystal at about 1000° C. Cracks appear during the phase transition in some cases. Stabilized zirconium oxide contains 1 to 30 mole % of a stabilizer such as calcium oxide, magnesium oxide, yttrium oxide, scandium oxide, ytterbium oxide, cerium oxide, and oxides of rare earth metals. In order to enhance the mechanical strength of the vibrating section 22, the stabilizer preferably contains yttrium oxide. In this composition, yttrium oxide is contained preferably in an amount of 1.5 to 6 mole %, and more preferably 2 to 4 mole %. It is much more preferable that aluminum oxide is further contained in an amount of 0.1 to 5 mole %.

The crystal phase may be, for example, a mixed phase of cubic crystal+monoclinic crystal, a mixed phase of tetragonal crystal+monoclinic crystal, and a mixed phase of cubic crystal+tetragonal crystal+monoclinic crystal. However, among them, most preferred are those having a principal crystal phase composed of tetragonal crystal or a mixed phase of tetragonal crystal+cubic crystal, from viewpoints of strength, toughness, and durability.

When the vibrating section 38 is composed of ceramics, a large number of crystal grains construct the vibrating section 38. In order to increase the mechanical strength of the vibrating section 38, the crystal grains preferably have an average grain diameter of 0.05 to 2 $\mu$m, and more preferably 0.1 to 1 $\mu$m.

The fixed section 40 is preferably composed of ceramics. The fixed section 40 may be composed of the same ceramic material as that used for the vibrating section 38, or the fixed section 40 may be composed of a ceramic material different from that used for the vibrating section 38. With respect to the ceramic material of the fixed section 40, it is possible to use stabilized zirconium oxide, aluminum oxide, magnesium oxide, titanium oxide, spinel, mullite, aluminum nitride, silicon nitride, glass, and mixtures thereof, in the same manner as the material for the vibrating section 38.

Especially, materials preferably adopted for the actuator substrate 32 used in the display device 10 include, for example, materials containing a major component of zirconium oxide, materials containing a major component of aluminum oxide, and materials containing a major component of a mixture thereof. Among them, those containing a major component of zirconium oxide are more preferable.

Clay or the like is added as a sintering aid in some cases. However, it is necessary to control components of the sintering aid in order not to contain an excessive amount of those liable to form glass such as silicon oxide and boron oxide for the following reason. That is, although the materials which are liable to form glass are advantageous to join the actuator substrate 32 to the shape-retaining layer 46, the materials facilitate the reaction between the actuator substrate 32 and the shape-retaining layer 46, making it difficult to maintain a predetermined composition of the shape-retaining layer 46. As a result, the materials make a cause to deteriorate the element characteristics.

That is, it is preferable that silicon oxide or the like in the actuator substrate 32 is restricted to have a weight ratio of not more than 3%, and more preferably not more than 1%. The term "major component" herein refers to a component which exists in a proportion of not less than 50% in weight ratio.

As described above, piezoelectric/electrostrictive layers and anti-ferroelectric layers can be used as the shape-retaining layer 46. However, with respect to the piezoelectric/electrostrictive layer used as the shape-retaining layer 46, it is possible to use ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, or any combination of them.

It is needless to say that the major component contains the compound as described above in an amount of not less than 50% by weight. Among the ceramic materials described above, the ceramic material containing lead zirconate is most frequently used as the constitutive material for the piezoelectric/electrostrictive layer of the shape-retaining layer 46.

When the piezoelectric/electrostrictive layer is composed of ceramics, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof.

For example, it is preferable to use ceramics containing a major component composed of lead magnesium niobate, lead zirconate, and lead titanate and further containing lanthanum and/or strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 46, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and/or lead niobate to a component composed of lead zirconate and lead stannate.

Especially, when an anti-ferroelectric film, which contains the component composed of lead zirconate and lead stannate as represented by the following composition, is applied as a film-type element such as the actuator element 22, it is possible to perform the driving at a relatively low voltage. Therefore, application of such an anti-ferroelectric film is especially preferred.

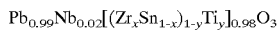

$$Pb_{0.99}Nb_{0.02}[(Zr_xSn_{1-x})_{1-y}Ti_y]_{0.98}O_3$$

wherein, $0.5<x<0.6$, $0.05<y<0.063$, $0.01<Nb<0.03$.

The anti-ferroelectric film may be porous. When the anti-ferroelectric film is porous, it is desirable that the porosity is not more than 30%.

Those usable as the method for forming the shape-retaining layer 46 on the vibrating section 38 include various types of the thick film formation method such as the screen printing method, the dipping method, the application method, and the electrophoresis method, and various types of the thin film formation method such as the ion beam method, the sputtering method, the vacuum evaporation method, the ion plating method, the chemical vapor deposition method (CVD), and the plating.

In this embodiment, when the shape-retaining layer 46 is formed on the vibrating section 38, the thick film formation method is preferably adopted, based on, for example, the screen printing method, the dipping method, the application method, and the electrophoresis method, for the following reason.

That is, in the techniques described above, the shape-retaining layer 46 can be formed by using, for example, paste, slurry, suspension, emulsion, or sol containing a major component of piezoelectric ceramic particles having an average grain size of 0.01 to 5 $\mu$m, preferably 0.05 to 3 $\mu$m, in which it is possible to obtain good piezoelectric operation characteristics.

Especially, the electrophoresis method makes it possible to form the film at a high density with a high shape accuracy, and it further has the features as described in technical literatures such as "Electrochemistry and Industrial Physical Chemistry, Vol. 53, No. 1 (1985), pp. 63–68, written by Kazuo ANZAI" and "Proceedings of First Study Meeting on Higher Order Ceramic Formation Method Based on Electrophoresis (1998), pp. 5–6 and pp. 23–24". Therefore, the technique may be appropriately selected and used considering, for example, the required accuracy and the reliability.

It is preferable that the thickness of the vibrating section 38 has a dimension identical to that of the thickness of the shape-retaining layer 46, for the following reason. That is, if the thickness of the vibrating section 38 is extremely thicker than the thickness of the shape-retaining layer 46 (if the former is different from the latter by not less than one figure), when the shape-retaining layer 46 makes shrinkage upon sintering, then the vibrating section 38 behaves to inhibit the shrinkage. For this reason, the stress at the boundary surface between the shape-retaining layer 46 and the actuator substrate 32 is increased, and consequently they are easily peeled off from each other. When the dimension of the thickness is in an identical degree between the both, it is easy for the actuator substrate 32 (vibrating section 38) to follow the shrinkage of the shape-retaining layer 46 upon sintering. Accordingly, such dimension of the thickness is preferred to achieve integration. Specifically, the vibrating section 38 preferably has a thickness of 1 to 100 $\mu$m, more preferably 3 to 50 $\mu$m, and much more preferably 5 to 20 $\mu$m. On the other hand, the shape-retaining layer 46 preferably has a thickness of 5 to 100 $\mu$m, more preferably 5 to 50 $\mu$m, and much more preferably 5 to 30 $\mu$m.

The row electrode 48a and the column electrode 48b formed on the upper surface and the lower surface of the shape-retaining layer 46, or the pair of electrodes 34 formed on the shape-retaining layer 46 are allowed to have an appropriate thickness depending on the use or application. However, the thickness is preferably 0.01 to 50 $\mu$m, and more preferably 0.1 to 5 $\mu$m. The row electrode 48a and the column electrode 48b are preferably composed of a conductive metal which is solid at room temperature. The metal includes, for example, pure metal or alloys containing, for example, aluminum, titanium, chromium, iron, cobalt, nickel, copper, zinc, niobium, molybdenum, ruthenium, rhodium, silver, stannum, tantalum, tungsten, iridium, platinum, gold, and lead. It is needless to say that these elements may be contained in an arbitrary combination.

It is preferable to add, to the pure metal and the alloy, a metal oxide such as aluminum oxide, titanium oxide, zirconium oxide, cerium oxide, and copper oxide. Further, it is also preferable to prepare a cermet in which the same materials as those used for the vibrating section 38 and/or the piezoelectric/electrostrictive layer and/or the anti-ferroelectric layer are dispersed in the pure metal and the alloy. Especially, when the cermet is used for the electrode, it is possible to effectively suppress the time-dependent deterioration of the displacement action when the shape-retaining layer 46 is operated.

The optical waveguide plate 20 has an optical refractive index with which the light 18 introduced into the inside thereof is totally reflected by the front and back surfaces without being transmitted to the outside of the optical waveguide plate 20. It is necessary for the optical waveguide plate 20 to use those having a large and uniform light transmittance in the wavelength region of the light 18 to be introduced. The material for the optical waveguide plate 20 is not specifically limited provided that it satisfies the foregoing characteristic. However, specifically, those generally used for the optical waveguide plate 20 include, for example, glass, quartz, light-transmissive plastics such as acrylic plastics, light-transmissive ceramics, structural materials comprising a plurality of layers composed of materials having different refractive indexes, and those having a surface coating layer.

The color layer 52 composed of, for example, the color filter and the color scattering element included in the picture element assembly 30 is the layer which is used to extract only the light in a specified wavelength region, and it includes, for example, those which develop the color by absorbing, transmitting, reflecting, or scattering the light at a specified wavelength, and those which convert incident light into light having a different wavelength. The transparent member, the semitransparent member, and the opaque member can be used singly or in combination.

The color layer 52 is constructed, for example, as follows. That is, the color layer 52 includes, for example, those obtained by dispersing or dissolving a fluorescent material or a dyestuff such as dye, pigment, and ion in rubber, organic resin, light-transmissive ceramics, glass, liquid or the like, those obtained by applying the dyestuff or the fluorescent material on the surface of the foregoing material, those obtained by sintering, for example, the powder of the dyestuff or the fluorescent material, and those obtained by pressing and solidifying the powder of the dyestuff or the fluorescent material. As for the material quality and the structure, the materials may be used singly, or the materials may be used in combination.

The difference between the color filter and the color scattering element lies in whether or not the luminance value of leakage light obtained by reflection and scattering effected by only the color layer 52 is not less than 0.5-fold the luminance value of leakage light obtained by reflection and scattering effected by the entire structure including the picture element assembly 30 and the actuator element 22, when the light emission state is given by allowing the picture element assembly 30 to make contact with the optical waveguide plate 20 into which the light 18 is introduced. If the former luminance value is not less than 0.5-fold the latter luminance value, the color layer 52 is defined to be the color scattering element. If the former luminance value is less than 0.5-fold the latter luminance value, the color layer 52 is defined to be the color filter.

The measuring method is specifically exemplified as follows. That is, it is assumed that when the color layer 52 alone contacts the back surface of the optical waveguide plate 20 into which the light 18 is introduced, A(nt) represents the front luminance of the light which passes from the color layer 52 through the optical waveguide plate 20 and which leaks to the front surface. Further, it is assumed that when the picture element assembly 30 is allowed to make contact with the surface of the color layer 52 on the side opposite to the side to make contact with the optical waveguide plate 20, B(nt) represents the front luminance of the light which leaks to the front surface. If $A \geq 0.5 \times B$ is satisfied, the color layer 52 is the color scattering element. If $A < 0.5 \times B$ is satisfied, the color layer 52 is the color filter.

The front luminance is the luminance measured by arranging a luminance meter so that the line to connect the color layer 52 to the luminance meter for measuring the luminance is perpendicular to the surface of the optical waveguide plate 20 to make contact with the color layer 52 (the detection surface of the luminance meter is parallel to the plate surface of the optical waveguide plate 20).

The color scattering element is advantageous in that the color tone and the luminance are scarcely changed depending on the thickness of the layer. Accordingly, those applicable as the method for forming the layer includes various methods such as the screen printing which requires inexpensive cost although it is difficult to strictly control the layer thickness.

Owing to the arrangement in which the color scattering element also serves as the displacement-transmitting section, it is possible to simplify the process for forming the layer. Further, it is possible to obtain a thin entire layer thickness. Therefore, the thickness of the entire display device 10 can be made thin. Further, it is possible to avoid the decrease in displacement amount of the actuator element 22, and improve the response speed.

The method for forming the film of the color layer 52 composed of, for example, the color filter and the color scattering element is not specifically limited, to which it is possible to apply a variety of known film formation methods. Those usable include, for example, a film lamination method in which the color layer 52 in a chip form or in a film form is directly stuck on the surface of the actuator element 22, as well as a method for forming the color layer 52 in which, for example, powder, paste, liquid, gas, or ion to serve as a raw material for the color layer 52 is formed into a film in accordance with the thick film formation method such as the screen printing, the photolithography method, the spray dipping, and the application, or in accordance with the thin film formation method such as the ion beam, the sputtering, the vacuum evaporation, the ion plating, CVD, and the plating.

Alternatively, it is also preferable that a light emissive layer is provided for a part or all of the picture element assembly 30. Those usable as the light-emissive layer include a fluorescent layer. The fluorescent layer includes materials which are excited by invisible light (ultraviolet light and infrared light) to emit visible light, or materials which are excited by visible light to emit visible light.

Fluorescent pigments may be also used for the light-emissive layer. If the fluorescent pigment added with fluorescent light having a wavelength approximately coincident with the color of the pigment itself, i.e., the color of reflected light is used, the color stimulus is large corresponding thereto, and the light emission is vivid. Therefore, the fluorescent pigment is used more preferably to obtain the high luminance for the display device 10 and the large screen display 100. A daylight fluorescent pigment is preferably used.

A stimulus fluorescent material, a phosphorescent material, or a luminous pigment is also used for the light-emissive layer. These materials may be either organic materials or inorganic materials.

Those preferably used include those formed with the light-emissive layer by using the light-emissive material as described above singly, those formed with the light-emissive layer by using the light-emissive material as described above dispersed in resin, and those formed with the light-emissive layer by using the light-emissive material as described above dissolved in resin.

The afterglow or decay time of the light-emissive material is preferably not more than 1 second, and more preferably not more than 30 milliseconds. Much more preferably, the afterglow or decay time is not more than several milliseconds.

When the light-emissive layer is used as a part or all of the picture element assembly 30, the light source 16 is not specifically limited provided that it includes the light having a wavelength capable of exciting the light-emissive layer and it has an energy density sufficient for excitation. Those usable include, for example, cold cathode tube, hot cathode tube (or one arranged with carbon nano tube-field emitter in place of filament-shaped hot cathode), metal halide lamp, xenon lamp, laser including infrared laser, black light, halogen lamp, incandescent lamp, deuterium discharge lamp, fluorescent lamp, mercury lamp, tritium lamp, light emitting diode, and plasma light source.

Next, the operation of the display device 10 according to the embodiment of the present invention will be briefly explained with reference to FIG. 2. As shown in FIG. 9, the description of the operation is illustrative of a case in which the offset potential, which is applied to the row electrode 48a of each of the actuator elements 22, is, for example, 10 V, and the electric potentials of the ON signal and the OFF signal, which are applied to the column electrode 48*b* of each of the actuator elements 22, are 0 V and 60 V respectively.

Therefore, the low level voltage (−10 V) is applied between the column electrode 48*b* and the row electrode 48*a* in the actuator element 22 in which the ON signal is applied to the column electrode 48*b*. The high level voltage (50 V) is applied between the column electrode 48*b* and the row electrode 48*a* in the actuator element 22 in which the OFF signal is applied to the column electrode 48*b*.

At first, the light 18 is introduced, for example, from the end portion of the optical waveguide plate 20. In this embodiment, all of the light 18 is totally reflected in the optical waveguide plate 20 without being transmitted through the front and back surfaces thereof by controlling the magnitude of the refractive index of the optical waveguide plate 20, in the state in which the picture element assembly 30 does not make contact with the optical waveguide plate 20. The reflection factor n of the optical waveguide plate 20 is desirably 1.3 to 1.8, and more desirably 1.4 to 1.7.

In this embodiment, in the neutral state of the actuator element 22, the end surface of the picture element assembly 30 contacts with the back surface of the optical waveguide plate 20 at the distance of not more than the wavelength of the light 18. Therefore, the light 18 is reflected by the surface of the picture element assembly 30, and it behaves as scattered light 62. A part of the scattered light 62 is reflected again in the optical waveguide plate 20. However, almost all of the scattered light 62 is not reflected by the optical waveguide plate 20, and it is transmitted through the front surface (face) of the optical waveguide plate 20. Accordingly, all of the actuator elements 22 are in the ON state, and the ON state is expressed in a form of light emission. Further, the color of the light emission corresponds to the color of the color layer 52 included in the picture element assembly 30.

Starting from this state, when the OFF signal is applied to the actuator element 22 corresponding to a certain dot 26, the actuator element 22 makes the bending displacement to be convex toward the hollow space 34 as shown in FIG. 2, i.e., it makes the bending displacement in the first direction. The end surface of the picture element assembly 30 is separated from the optical waveguide plate 20, and the actuator element 22 is in the OFF state. The OFF state is expressed in a form of light off.

That is, in the display device 10, the presence or absence of light emission (leakage light) at the front surface of the optical waveguide plate 20 can be controlled depending on the presence or absence of the contact of the picture element assembly 30 with the optical waveguide plate 20.

Especially, in the display device 10, one unit for making the displacement action of the picture element assembly 30 in the direction to make contact or separation with respect to the optical waveguide plate 20 is arranged in the vertical direction to be used as one dot. The array of the three dots in the horizontal direction (red dot 26R, green dot 26G, and blue dot 26B) is used as one picture element. A large number of the picture elements are arranged in a matrix configuration or in a zigzag configuration concerning the respective rows. Therefore, it is possible to display a color screen image (characters and graphics) corresponding to the image signal on the front surface of the optical waveguide plate 20, i.e., on the display surface, in the same manner as in the cathode ray tube, the liquid crystal display device, and the plasma display, by controlling the displacement action in each of the picture elements in accordance with the attribute of the inputted image signal.

Figure 10:
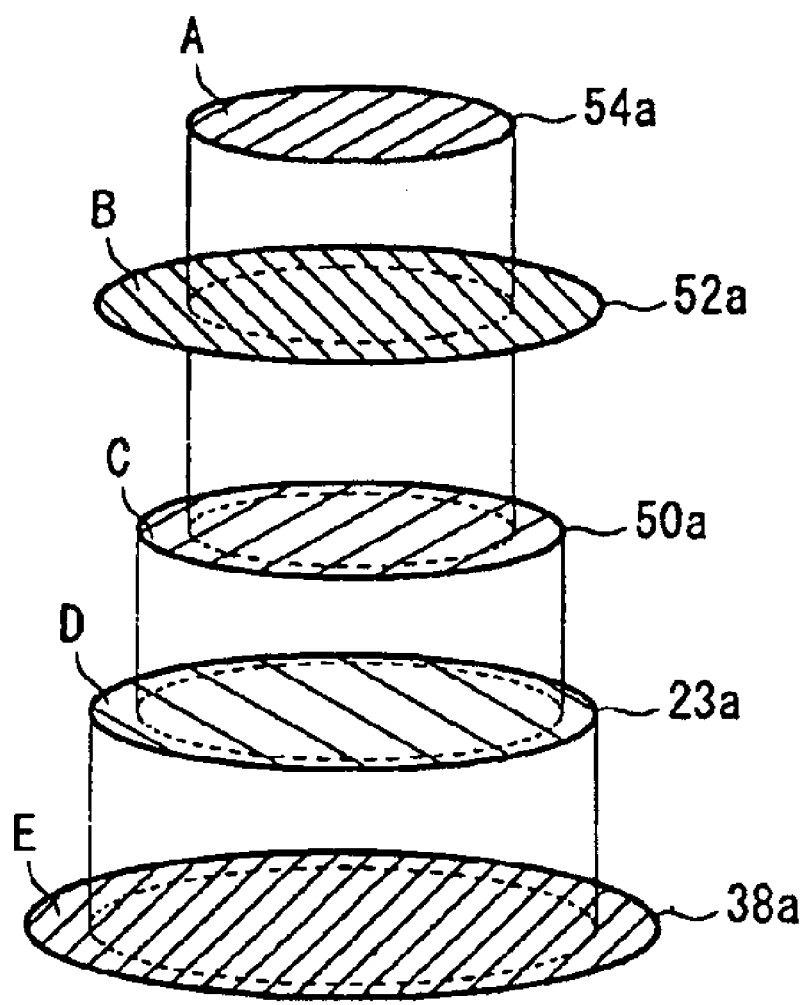
FIG. 10 illustrates the dimensional relationship among an opposed area of a transparent layer opposed to an optical waveguide plate, a projected area of a color layer, a projected area of a white scattering element layer, a projected area of a main actuator element, and a projected area of a vibrating section in the display device according to the embodiment of the present invention.

In the display device 10 according to this embodiment, as shown in FIGS. 2, 7, and 10, the area (opposed area) A of the surface 54*a* of the transparent layer 54 opposed to the optical waveguide plate 20 is identical with or smaller than the area (projected area) B of the projected plane 52*a* on the plane of the color layer 52. The area (projected area) C of the projected plane 50*a* on the plane of the white scattering element 50 is identical with or smaller than the projected area B of the color layer 52.

Further, in this embodiment, the opposed area A of the transparent layer 54 opposed to the optical waveguide plate 20 is identical with or smaller than the projected area C of the white scattering element 50.

Further, in the embodiment of the present invention, the projected area B of the color layer 52 is identical with or smaller than the area (projected area) D of the projected plane 23*a* on the plane of the main actuator element 23. The projected area D of the main actuator element 23 is identical with or smaller than the area (projected area) E of the projected plane 38*a* on the plane of the vibrating section 38.

Explanation will now be made principally for the introduction of the light 18 into the picture element assembly 30. When the transparent layer 54 makes contact with the optical waveguide plate 20, or when the transparent layer 54 stands close to the optical waveguide plate 20, then the light 18 from the optical waveguide plate 20 is introduced into the picture element assembly 30 through the surface 54*a* of the transparent layer 54 opposed to the optical waveguide plate 20. The light 18, which has been introduced into the picture element assembly 30, travels toward the actuator substrate 32.

During this process, if the projected area B of the color layer 52 is smaller than the opposed area A of the transparent layer 54 opposed to the optical waveguide plate 20, then a part of the light 18 introduced through the surface 54*a* of the transparent layer 54 opposed to the optical waveguide plate 20, especially the light, which is transmitted through the side surfaces of the transparent layer 54, arrives at the actuator element 22 and/or the actuator substrate 32, and the light is reflected as unnecessary scattered light toward the optical waveguide plate 20. In this situation, the scattered light (color scattered light), which is brought about by the reflection of the light having effectively arrived at the color layer 52, may be mixed with the unnecessary scattered light, resulting in decrease in apparent luminance and decrease in contrast.

In view of the above, it is conceived that the areas of both of the transparent layer 54 and the color layer 52 are widened. However, if the area of the transparent layer 54 is widened, the area, with which the transparent layer 54 contacts with the optical waveguide plate 20, is also widened. Therefore, the amount of light introduced into the picture element assembly 30 is increased, and a larger amount of light is consumed by one picture element or by one dot. As a result, the amount of light 18 supplied to the central portion of the optical waveguide plate 20 may be decreased, for example, when the light 18 is introduced from the periphery of the optical waveguide plate 20, and the evenness of the display luminance may be lowered when a single color is displayed.

However, in the display device 10 according to the present invention, both of the projected area B of the color layer 52 and the projected area C of the white scattering element 50 are not less than the opposed area A of the transparent layer 54 opposed to the optical waveguide plate 20. Therefore, almost all of the light 18 introduced from the surface 54*a* of the transparent layer 54 opposed to the optical waveguide plate 20 including the light transmitted through the side surfaces of the transparent layer 54 arrives at the color layer 52 and the white scattering element 50.

Further, in the embodiment of the present invention, the projected area B of the color layer 52 is not less than the projected area C of the white scattering element 50.

Therefore, the light 18 does not come into only the white scattering element 50. The light 18, which is introduced from the surface 54a of the transparent layer 54 opposed to the optical waveguide plate 20, including the light transmitted through the side surfaces of the transparent layer 54, is reflected as the effective color scattered light toward the optical waveguide plate 20.

That is, in the embodiment of the present invention, as shown in FIGS. 7 and 10, the area of the transparent layer 54 is included in the area of the color layer 52 as viewed in the plan view. More specifically, the area of the white scattering element 50 is included in the area of the color layer 52, and the area of the transparent layer 54 is included in the area of the white scattering element 50. Therefore, the light, which comes into the transparent layer 54 in all directions, can be reflected by the color layer 52, and the light can behave as the effective color scattered light which is successfully allowed to come into the optical waveguide plate 20.

Accordingly, it is possible to realize a high grade of the image quality, for example, such that the contrast is improved and the color purity is improved.

As described above, in the display device 10 according to the present invention, it is possible to greatly improve the rate of utilization of the light 18 introduced into the picture element assembly 30, and it is possible to improve the luminance. Accordingly, it is possible to decrease the projected area A of the surface 54a of the transparent layer 54 opposed to the optical waveguide plate 20, it is possible to reduce the amount of light 18 introduced into the picture element assembly 30, and it is possible to decrease the consumption of light per one picture element or one dot. As a result, for example, when the light 18 is introduced from the periphery of the optical waveguide plate 20, it is possible to suppress the decrease in amount of light supplied to the central portion of the optical waveguide plate 20. Further, it is possible to secure the evenness of the display luminance when a single color is displayed.

As for the respective projected areas B and C of the color layer 52 and the white scattering element 50, the entire surface of the actuator substrate 32 including the main actuator element 23 may be covered in order to improve the display luminance. However, if the respective projected areas B and C of the color layer 52 and the white scattering element 50 are larger than the respective projected areas D and E of the main actuator element 23 and the vibrating section 38, then the displacement amount of the actuator element 22 may be extremely lowered, or the lighted room contrast may be lowered. Therefore, an appropriate size may be selected. Desirably, the projected area B of the color layer 52 is made smaller than the projected area E of the vibrating section 38. In the embodiment of the present invention, as shown in FIGS. 2, 7, and 10, the projected area B of the color layer 52 is identical with or smaller than the projected area D of the main actuator element 23, and the projected area D of the main actuator element 23 is identical with or smaller than the projected area E of the vibrating section 38.

For example, when a display device for the white color is manufactured, the present invention may be carried out by replacing the color layer 52 with the white scattering element 50.

Next, three modified embodiments of the display device 10 according to the embodiment of the present invention will be explained with reference to FIGS. 11 to 13. The white scattering element 50 is omitted from illustrations in FIGS. 11 and 12.

Figure 11:
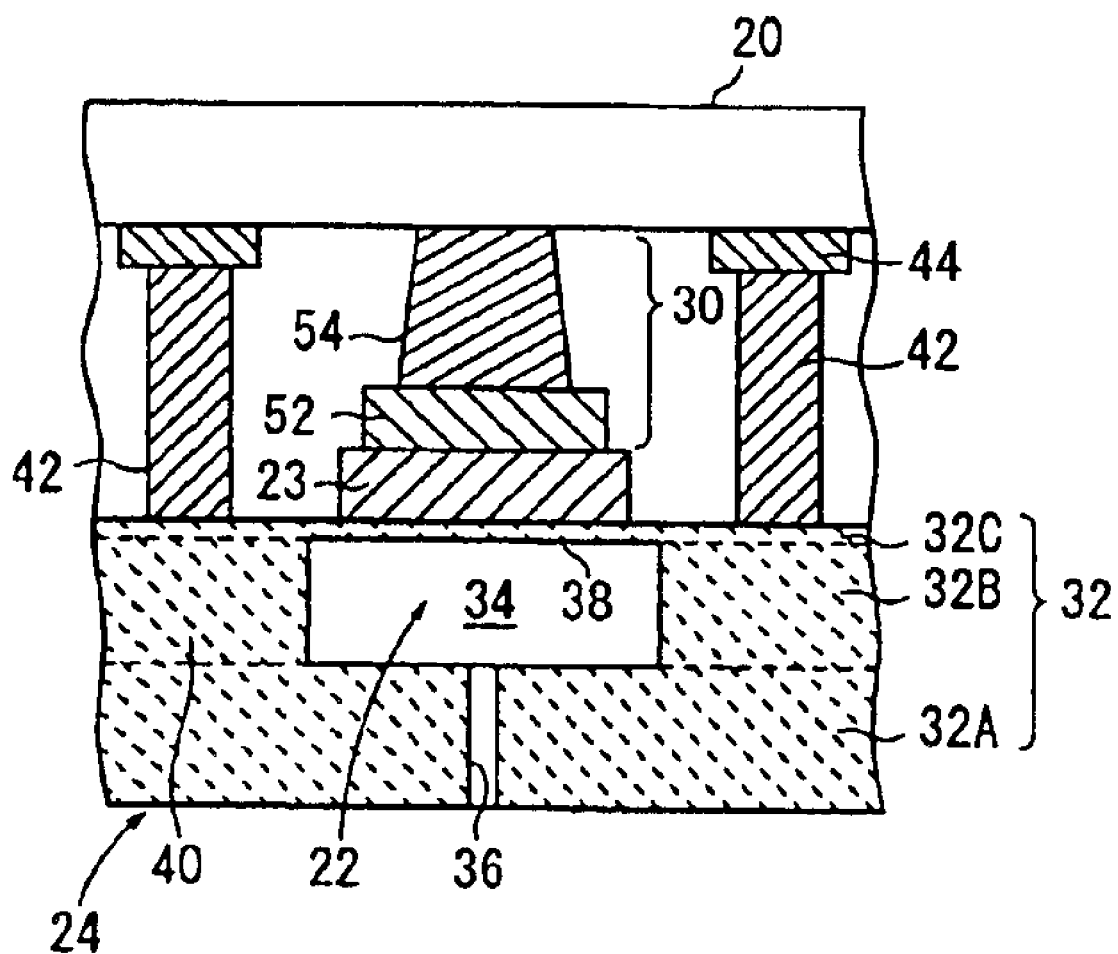
FIG. 11 shows an arrangement of a display device according to a first modified embodiment.

At first, a display device 10a according to a first modified embodiment is shown in FIG. 11. The display device 10a is constructed as follows. That is, the opposed area A of the transparent layer 54 is identical with or smaller than the projected area B of the color layer 52, and the projected area B of the color layer 52 is identical with or smaller than the projected area D of the main actuator element 23.

Also in this arrangement, all of the light 18, which is introduced into the picture element assembly 30 from the surface 54a of the transparent layer 54 opposed to the optical waveguide plate 20, is successfully allowed to arrive at the color layer 52.

Figure 12:
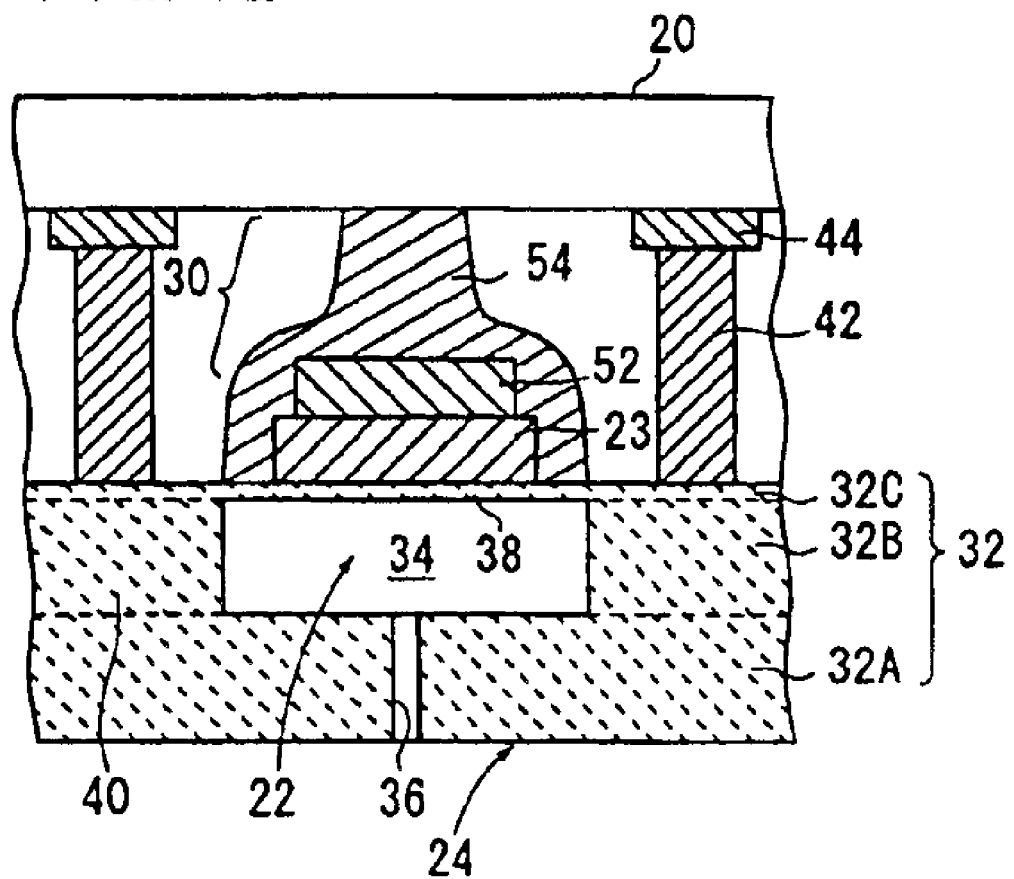
FIG. 12 shows an arrangement of a display device according to a second modified embodiment.
Figure 13:
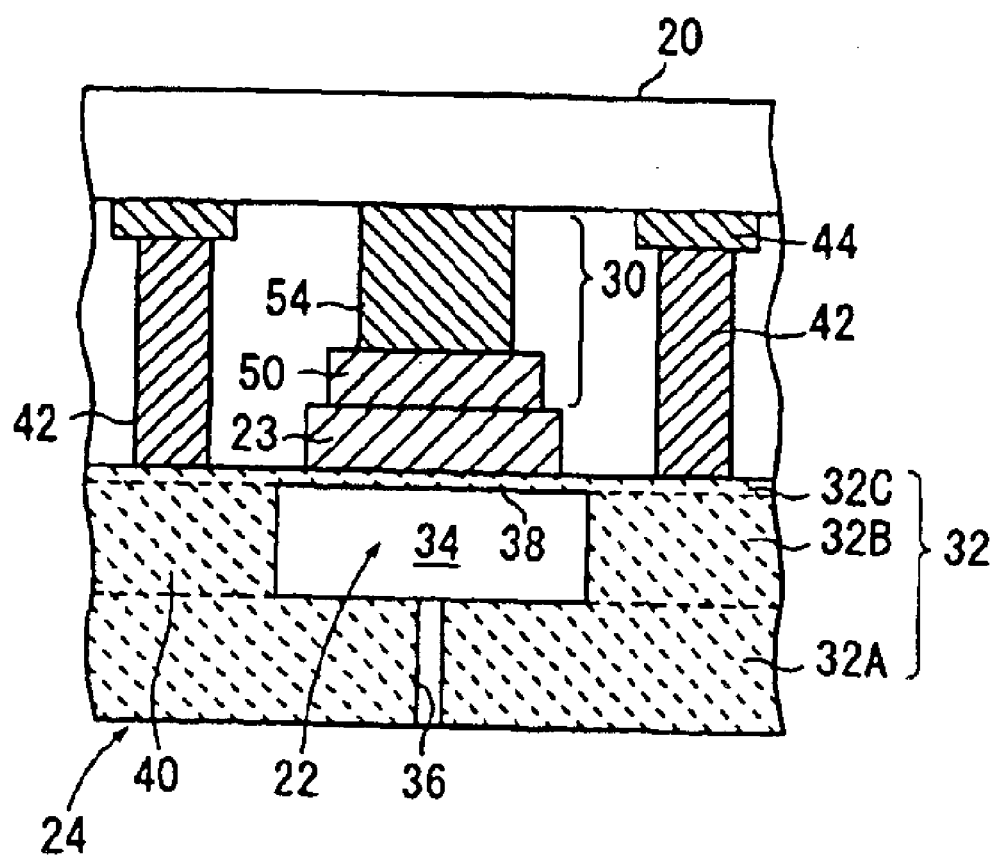
FIG. 13 shows an arrangement of a display device according to a third modified embodiment.

Next, as shown in FIG. 12, a display device 10b according to a second modified embodiment is constructed in approximately the same manner as the display device 10a according to the first modified embodiment. However, the former is different from the latter in that the transparent layer 54 is formed to cover the main actuator element 23 and the color layer 52 therewith. That is, in this arrangement, the maximum projected area on the plane of the transparent layer 54 is larger than the projected area B of the color layer 52, and it is identical with or smaller than the projected area E of the vibrating section 38. In this arrangement, the maximum projected area on the plane of the transparent layer 54 may be larger than the projected area E of the vibrating section 38. However, it is preferable that the maximum projected area on the plane of the transparent layer 54 is identical with or smaller than the projected area E of the vibrating section 38 as in the second modified embodiment, because the displacement action of the actuator element 22 may be inhibited by the transparent layer 54.

The display device 10b according to the second modified embodiment is equivalent to the display device 10a according to the first modified embodiment in that the opposed area A of the transparent layer 54 opposed to the optical waveguide plate 20 is identical with or smaller than the projected area B of the color layer 52, the projected area B of the color layer 52 is identical with or smaller than the projected area D of the main actuator element 23, and the projected area D of the main actuator element 23 is identical with or smaller than the projected area E of the vibrating section 38.

Also in this arrangement, all of the light 18, which is introduced into the picture element assembly 30 from the surface 54a of the transparent layer 54 opposed to the optical waveguide plate 20, is successfully allowed to arrive at the color layer 52, in the same manner as in the first modified embodiment.

The embodiments described above are illustrative of the case in which the picture element assembly 30 is constructed with the transparent layer 54, the color layer 52, and the white scattering element 50. Alternatively, as in a display device 10c according to a third modified embodiment shown in FIG. 13, the picture element assembly 30 may be constructed with the transparent layer 54 and the white scattering element 50. Also in this arrangement, the opposed area A of the transparent layer 54 opposed to the optical waveguide plate 20 is identical with or smaller than the projected area C of the white scattering element 50.

Figure 14:
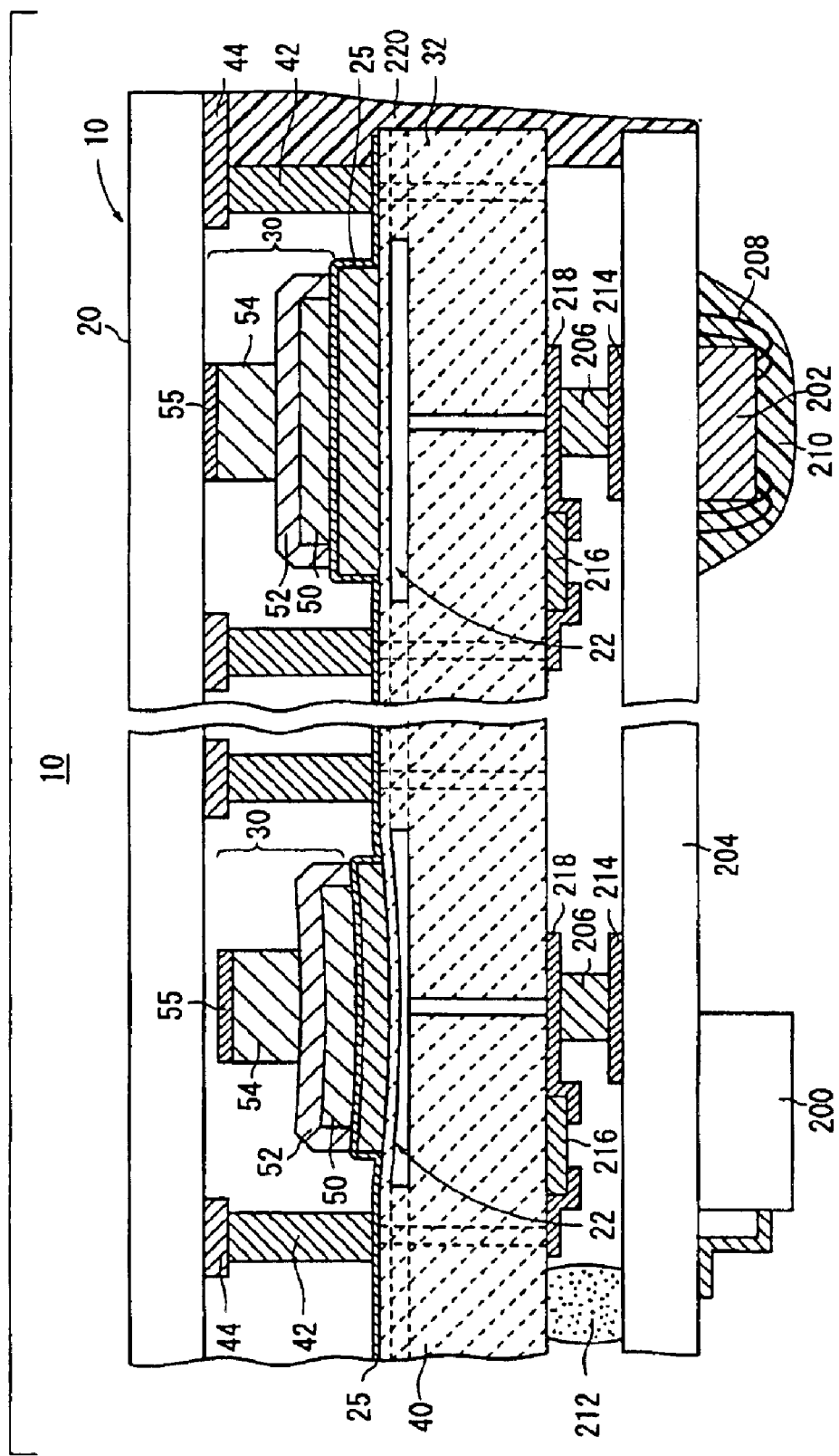
FIG. 14 principally illustrates a voltage supply system for the display device.
Figure 15:
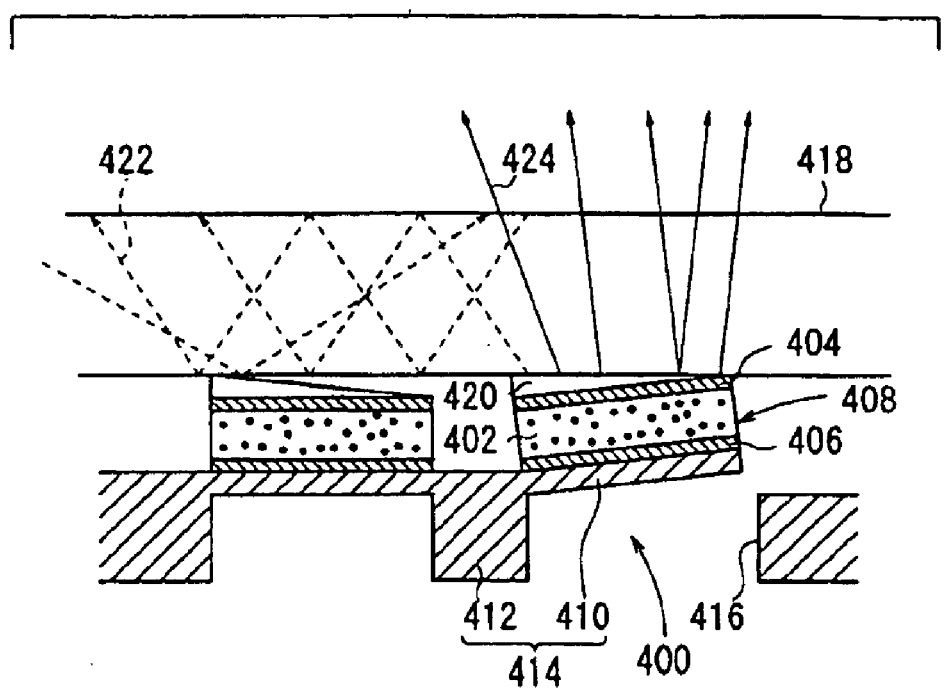
FIG. 15 shows an arrangement of an exemplary suggested display device.

Next, in order to make the display with the display device 10 according to the embodiment of the present invention, the voltage is supplied to the display device 10. This purpose can be realized such that electrodes, which are arranged in the vicinity of the ends of the actuator substrate 32 and on the back surface of the actuator substrate 32, are connected, for example, to lead wires, connectors, printed circuit board, and/or flexible printed circuit board. Further, circuit elements may be formed and parts may be mounted on the front surface and the back surface of the actuator substrate 32. A desired arrangement of the voltage supply system is shown in FIG. 14. FIG. 14 is illustrative of a case in which the picture element assembly 30 is constructed by including the white scattering element 50, the color layer 52, the transparent layer 54, and the adhesion suppressant 55.

As shown in FIG. 14, a wiring board 204, on which, for example, connectors and driver IC's 202 are mounted, is joined opposingly to the back surface side of the actuator substrate 32 (side opposite to the display surface), and the both components are electrically connected by the aid of conductive adhesives 206.

Those preferably used for the wiring board 204 include, for example, printed circuit boards, flexible printed circuit boards, build-up boards, and ceramic wiring boards. The wiring board 204 may be composed of either a single layer or multiple layers.

The driver IC's 202, the connectors 200, and other parts are mounted on the wiring board 204 by using the mounting technique which is generally used. In FIG. 14, the driver IC's 202 are bonded to the wiring board 204, and then the wiring board 204 is electrically connected to pads of the driver IC's 202 by means of the wire bonding 208. After that, these components are coated with resin 210 by means of the potting. The components are soldered to the connectors 200.

The connecting portions between the wiring board 204 and the actuator substrate 32 may be subjected to the connection by applying any means other than the conductive adhesive 206, including, for example, soldering, anisotropic conductive film, conductive rubber, wire bonding, lead frame, pin, spring, and pressure-securing. In order to make the connection more reliably, it is also effective to arrange reinforcing adhesives 212.

With reference to FIG. 14, electrode pads 214, which is used to make the connection to the actuator substrate 32, are formed on the surface of the wiring board 204 opposed to the actuator substrate 32. The electrode pads 214 are arranged in the same pattern as that used on the side of the actuator substrate 32. The contour of the wiring board 204 has approximately the same size as that of the actuator substrate 32, in which the electrodes pads are arranged over the substantially entire surface.

With reference to FIG. 14, resistors 216 are formed on the back surface of the actuator substrate 32. The resistors 216 electrically intervene between the driver IC's 202 and the actuator elements 22 to restrict the current so that the actuator elements 22 and the driver IC's are protected and the stability of display is improved.

A variety of circuit may be formed and mounted on the actuator substrate 32 without being limited to the resistors 216. The circuit elements include, for example, connectors, sockets, and lead wires in addition to a variety of passive parts and active parts. The circuit elements may be formed, for example, by means of the thick film formation process or by means of the thin film formation process. Alternatively, for example, chip parts, discrete parts, and/or package parts may be mounted by means of the technique including, for example, soldering, conductive adhesive, anisotropic conductive film, conductive rubber, wire bonding, lead frame, pin, spring, and pressure-securing. The wiring of the actuator substrate 32 may be composed of either a single layer or multiple layers. The circuit elements may be formed such that the circuit elements are incorporated into the actuator substrate 32.

A variety of techniques may be adopted for the method for joining the wiring board 204 and the actuator substrate 32 by the aid of the conductive adhesives 206, in the same manner as in the case in which the glass and the actuator substrate 32 are stuck to one another. Especially, the vacuum packaging method is preferably used. The vacuum packaging method is performed as follows. At first, the conductive adhesives 206 are printed and formed on the electrode pads 214 on the wiring board 204 mounted with the parts disposed on the side of the actuator substrate 32, and then the conductive adhesives 206 are cured. Subsequently, the conductive adhesives 206 are printed on the electrode pads 218 disposed on the actuator substrate 32, and the reinforcing adhesives 212 are printed on the wiring board 204. The two substrates, i.e., the wiring board 204 and the actuator substrate 32 are positioned and stuck to one another. After that, the substrates in the stuck state, i.e., the wiring board 204 and the actuator substrate 32 are packed in a bag, followed by being evacuated in vacuum. Accordingly, the pressure is evenly applied in the directions in which the entire substrate surfaces are pressed to one another. Thus, the electric connection and the mechanical bonding are reliably effected everywhere. The conductive adhesives 206, which have been firstly printed and cured, serve as the spacers. Therefore, any inconvenience does not occur, which would be otherwise caused such that the uncured conductive adhesives 206 are spread to the adjoining electrodes to make any short circuit.

In order to enhance the reliability of the electric connection, the conductive adhesive 206 preferably has such a material quality that the conductive adhesive 206 is flexible as compared with the reinforcing adhesive 212. In order to maintain the high reliability for the picture element to make contact and separation, the conductive adhesive 206 and the reinforcing adhesive 212 to be used preferably have such material qualities that the conductive adhesive 206 and the reinforcing adhesive 212 are flexible as compared with the crosspiece 42 for fixing the actuator substrate 32 and the optical waveguide plate 20.

A sealing treatment is applied with sealing members 220 to the end surfaces of the display device 10. Accordingly, the interior of the display device 10 is protected to improve the reliability of display. Further, the mechanical strength of the end portion is increased so that the display device 10 is scarcely destructed. For example, resin, glass, and blazing can be used for the sealing member 220 to which a filler may be added, if necessary. The sealing member 220 is preferably made of a transparent or black material in order to suppress the scattering of the light to be low.

It is a matter of course that the display device according to the present invention is not limited to the embodiments described above, which may be embodied in other various forms without deviating from the gist or essential characteristics of the present invention.

What is claimed is:

1. A display device comprising a substrate which has actuator elements, an optical waveguide plate, crosspieces which intervene between said optical waveguide plate and said substrate and which surround said actuator element, and picture element assemblies which are joined onto said actuator elements, wherein said picture element assembly includes a transparent layer which makes contact with said optical waveguide plate or which stands close to said optical waveguide plate, and other layers for constructing said picture element assembly; and an area of a surface of said transparent layer opposed to said optical waveguide plate is smaller than an area of a surface of each of the other layers opposed to said optical waveguide plate.

2. The display device according to claim 1, wherein the other layers include a white scattering element.

3. The display device according to claim 1, wherein the other layers include a color layer.

4. The display device according to claim 3, wherein said color layer is a color filter.

5. The display device according to claim 3, wherein said color layer is a color scattering element.

6. The display device according to claim 1, wherein the other layers include a white scattering element and a color layer.

7. The display device according to claim 6, wherein an area of a surface of said white scattering element opposed to said optical waveguide plate is not larger than an area of a surface of said color layer opposed to said optical waveguide plate.

8. The display device according to claim 6, wherein said color layer is a color filter.

9. The display device according to claim 6, wherein said color layer is a color scattering element.

10. The display device according to claim 1, wherein said actuator element includes a vibrating section provided on said substrate and a main actuator element which is formed on said vibrating section; and an area of a surface of said picture element assembly opposed to said optical waveguide plate is not larger than an area of a surface of said vibrating section opposed to said optical waveguide plate.

11. The display device according to claim 10, wherein said area of a surface of said picture element assembly opposed to said optical waveguide plate is smaller than an area of a surface of said main actuator element opposed to said optical waveguide plate.

12. A device comprising a substrate which has actuator elements, an optical waveguide plate, crosspieces which intervene between said optical waveguide plate and said substrate and which surround said actuator element, and optical assemblies which are joined onto said actuator elements, wherein said optical assembly includes a transparent layer which makes contact with said optical waveguide plate or which stands close to said optical waveguide plate, and other layers for constructing said optical assembly; and an area of a surface of said transparent layer opposed to said optical waveguide plate is smaller than an area of a surface of each of the other layers opposed to said optical waveguide plate.

13. The device according to claim 12, wherein the other layers include a white scattering element.

14. The device according to claim 12, wherein the other layers include a color layer.

15. The device according to claim 14, wherein said color layer is a color filter.

16. The device according to claim 14, wherein said color layer is a color scattering element.

17. The device according to claim 12, wherein the other layers include a white scattering element and a color layer.

18. The device according to claim 17, wherein an area of a surface of said white scattering element opposed to said optical waveguide plate is not larger than an area of a surface of said color layer opposed to said optical waveguide plate.

19. The device according to claim 17, wherein said color layer is a color filter.

20. The device according to claim 17, wherein said color layer is a color scattering element.

21. The device according to claim 12, wherein said actuator element includes a vibrating section provided on said substrate and a main actuator element which is formed on said vibrating section; and an area of a surface of said optical assembly opposed to said optical waveguide plate is not larger than an area of a surface of said vibrating section opposed to said optical waveguide plate.

22. The device according to claim 21, wherein said area of a surface of said optical assembly opposed to said optical waveguide plate is smaller than an area of a surface of said main actuator element opposed to said optical waveguide plate.

* * * * *